(12) United States Patent
Boroditsky et al.

(10) Patent No.: US 9,766,625 B2
(45) Date of Patent: Sep. 19, 2017

(54) PERSONALIZED DRIVING OF AUTONOMOUSLY DRIVEN VEHICLES

(71) Applicant: HERE Global B.V., Veldhoven (NL)

(72) Inventors: Vladimir Boroditsky, Northbrook, IL (US); Leon Oliver Stenneth, Chicago, IL (US); James Adeyemi Fowe, Evanston, IL (US); Gavril Adrian Giurgiu, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 95 days.

(21) Appl. No.: 14/341,198

(22) Filed: Jul. 25, 2014

(65) Prior Publication Data

US 2016/0026182 A1 Jan. 28, 2016

(51) Int. Cl.
| | |
|---|---|
| *G05D 1/00* | (2006.01) |
| *B60K 31/00* | (2006.01) |
| *G08G 1/01* | (2006.01) |
| *G08G 1/00* | (2006.01) |
| *H04L 29/08* | (2006.01) |
| *G05D 1/02* | (2006.01) |

(52) U.S. Cl.
CPC .......... *G05D 1/0088* (2013.01); *B60K 31/00* (2013.01); *G05D 1/0221* (2013.01); *G08G 1/0112* (2013.01); *G08G 1/0129* (2013.01); *G08G 1/0145* (2013.01); *G08G 1/22* (2013.01); *H04L 67/10* (2013.01); *H04L 67/306* (2013.01); *G05D 2201/0213* (2013.01)

(58) Field of Classification Search
CPC .......... G05D 1/021; G05D 2201/0213; G05D 1/0214; G05D 1/0287; B60W 2050/0002; B60W 2050/0095; B60W 30/09; G07C 5/008

USPC .......................................................... 701/23
See application file for complete search history.

(56) References Cited

U.S. PATENT DOCUMENTS

| | | | |
|---|---|---|---|
| 4,286,846 | A | 9/1981 | Bollenbacher |
| 6,121,896 | A | 9/2000 | Rahman |
| 6,502,035 | B2 | 12/2002 | Levine |

(Continued)

FOREIGN PATENT DOCUMENTS

| | | |
|---|---|---|
| DE | 102011000409 | 8/2012 |
| DE | 102011012139 | 8/2012 |

(Continued)

OTHER PUBLICATIONS

PCT International Search Report and Written Opinion of the International Searching Authority dated Oct. 6, 2015 for corresponding PCT/IB2015/055328.

(Continued)

*Primary Examiner* — Jelani Smith
(74) *Attorney, Agent, or Firm* — Lempia Summerfield Katz LLC

(57) ABSTRACT

Methods for personalized driving of autonomously driven vehicles include: (a) downloading at least a portion of a driving profile to a vehicle, wherein the vehicle is configured for autonomous driving and wherein the driving profile is associated with a specific driver; and (b) executing one or a plurality of operating instructions prescribed by the driving profile, such that the vehicle is operable in a driving style imitative of the specific driver. Apparatuses for personalized driving of autonomously driven vehicles are described.

20 Claims, 18 Drawing Sheets

(56) References Cited

U.S. PATENT DOCUMENTS

| | | |
|---|---|---|
| 7,440,830 B2 | 10/2008 | Isaji et al. |
| 7,974,748 B2 | 7/2011 | Goerick et al. |
| 8,164,463 B2 | 4/2012 | Omi |
| 8,279,763 B2 | 10/2012 | Rozum et al. |
| 8,350,845 B2 | 1/2013 | Soulchin et al. |
| 8,634,980 B1 * | 1/2014 | Urmson ............... G05D 1/0214 701/23 |
| 8,635,018 B2 | 1/2014 | Chia et al. |
| 8,653,986 B2 | 2/2014 | Tamir et al. |
| 2004/0019426 A1 | 1/2004 | Knoop et al. |
| 2004/0143385 A1 | 7/2004 | Smyth et al. |
| 2005/0033517 A1 | 2/2005 | Kondoh et al. |
| 2007/0150157 A1 | 6/2007 | Lee et al. |
| 2008/0252487 A1 * | 10/2008 | McClellan ............ G01S 5/0027 340/936 |
| 2010/0256835 A1 * | 10/2010 | Mudalige ............... G08G 1/163 701/2 |
| 2010/0274435 A1 | 10/2010 | Kondoh et al. |
| 2011/0301802 A1 | 12/2011 | Rupp et al. |
| 2012/0083960 A1 | 4/2012 | Zhu et al. |
| 2013/0204455 A1 | 8/2013 | Chia et al. |
| 2013/0255930 A1 | 10/2013 | Prakah-Asante et al. |
| 2013/0304334 A1 * | 11/2013 | Fuehrer ................. G07C 5/008 701/51 |
| 2014/0136092 A1 * | 5/2014 | Robl ...................... G07C 5/008 701/123 |
| 2015/0149017 A1 * | 5/2015 | Attard ................. B60W 30/182 701/23 |
| 2015/0309512 A1 * | 10/2015 | Cudak .................... G05D 1/021 701/23 |

FOREIGN PATENT DOCUMENTS

| | | |
|---|---|---|
| DE | 102011106808 | 1/2013 |
| EP | 1302356 A1 | 4/2003 |
| EP | 2177878 A2 | 4/2010 |
| EP | 2234067 | 9/2010 |
| EP | 2662848 | 11/2013 |
| WO | WO2006073997 | 7/2006 |
| WO | WO2008127465 | 10/2008 |
| WO | WO2012092668 | 7/2012 |
| WO | WO2013072926 A2 | 5/2013 |
| WO | WO2013133791 | 9/2013 |
| WO | WO2014092628 A1 | 6/2014 |

OTHER PUBLICATIONS

Bishop, Patent Filing: Google's Self-Driving Car Could Pick Up the Kids, Swervce to Avoid Deer, Apr. 5, 2012, geekwire.com.

Sheldon Drobot et al., IntelliDrive Road Weather Research & Development—the Vehicle Data Translator, http://www.ops.fhwa.dot.gov/.

Swarun Kumar et al., A Cloud-Assisted Design for Autonomous Driving, 2012.

* cited by examiner

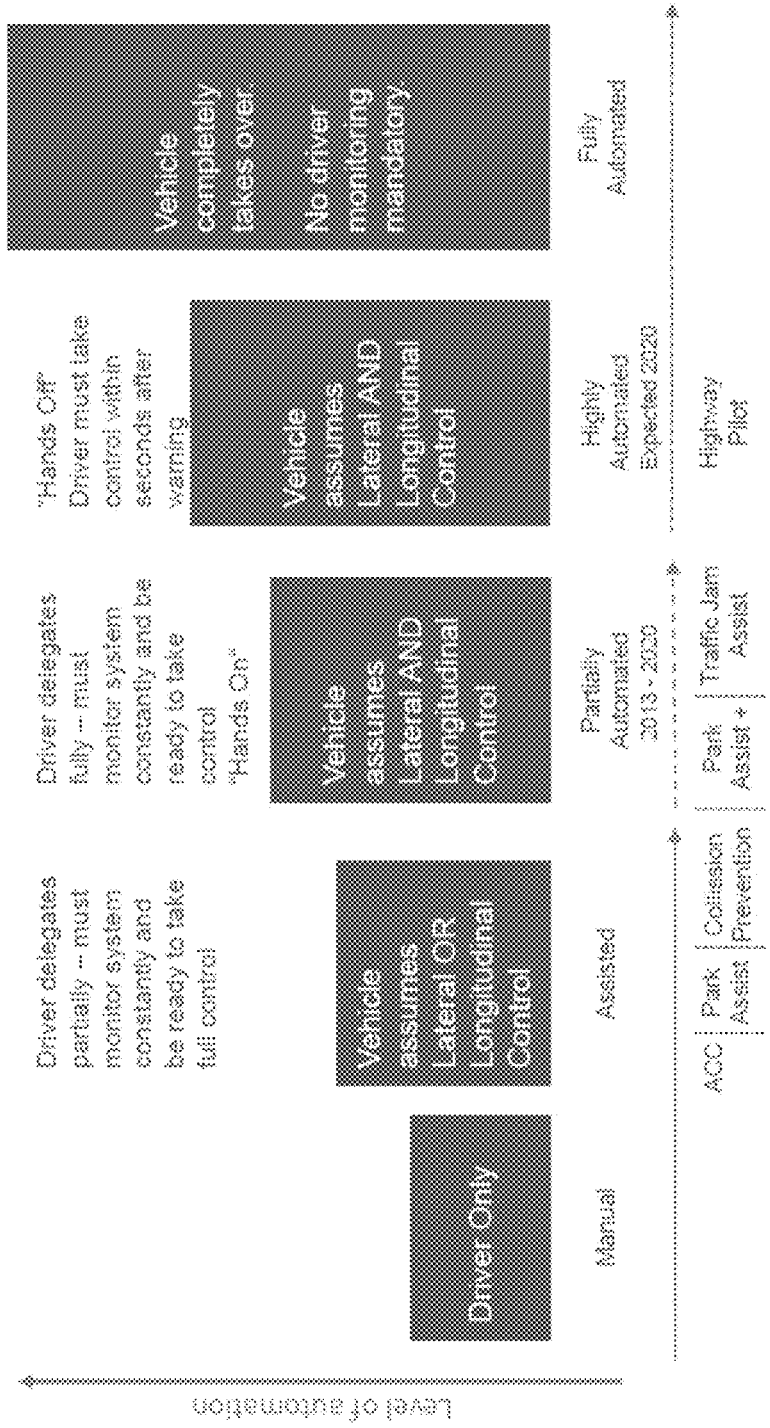

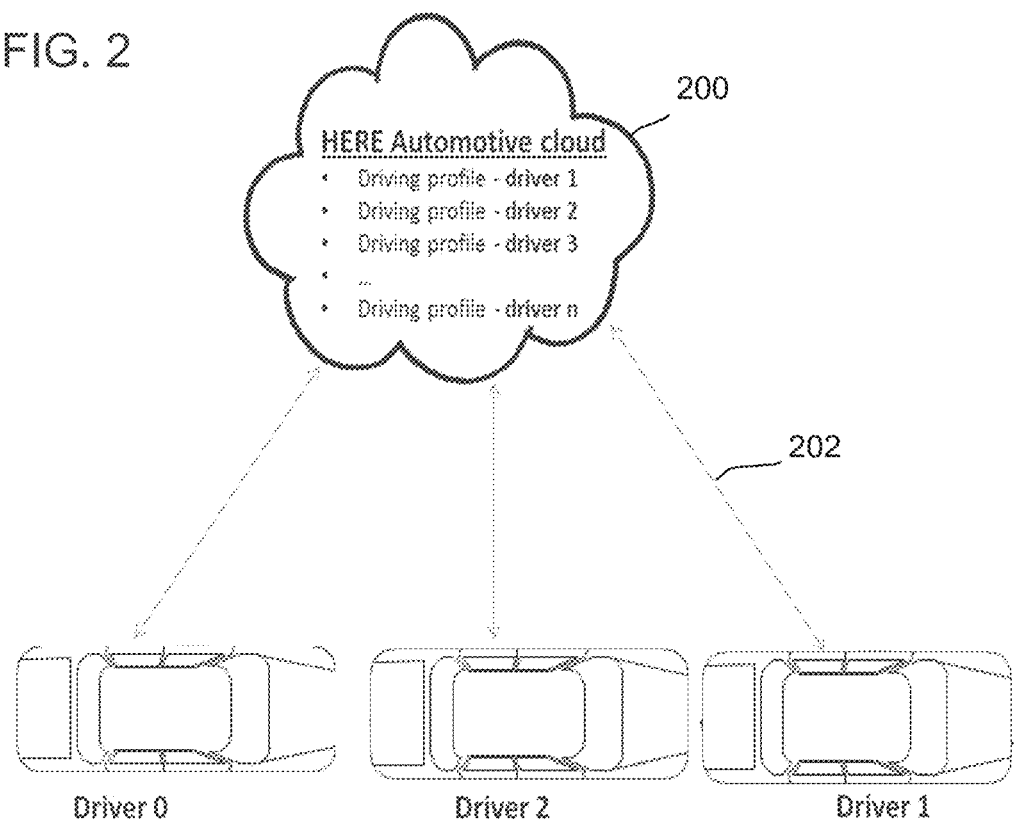

FIG. 18

| Expected driving behavior list | | The True driving behavior list |
|---|---|---|
| EDB: 40kph, 35°, 10ms⁻², 43 | | TDB: 140kph, 35°, 12ms⁻², 43 |
| EDB: 47kph, 62°, 10ms⁻², 43 | | TDB: 7kph, 52°, 20ms⁻², 43 |
| EDB: 70kph, 65°, 16ms⁻², 43 | | TDB: 70kph, 65°, 16ms⁻², 43 |
| EDB: 49kph, 63°, 1ms⁻², 43 | | TDB: 43kph, 62°, 1ms⁻², 43 |
| EDB: 30kph, 55°, 10ms⁻², 43 | | TDB: 30kph, 58°, 10ms⁻², 23 |

PERSONALIZED DRIVING OF AUTONOMOUSLY DRIVEN VEHICLES

TECHNICAL FIELD

The present teachings relate generally to autonomous driving and, in some embodiments, to autonomous driving ranging from assisted driving through fully automated driving.

BACKGROUND

Recent research demonstrates that a vehicle may be safely driven with limited or with no assistance from a human operator. Such vehicles are referred to as autonomous vehicles (a.k.a., driverless, self-driving, robotic, and/or driver-free vehicles). Autonomous vehicles may be equipped with sensors (e.g., radar sensors) that sense the environment of the vehicle as the vehicle travels. Moreover, autonomous vehicles may navigate without human input.

At present, autonomous vehicles exist primarily as prototypes and demonstration systems. However, in the future, autonomous vehicles may be used on public roadways. When autonomous vehicles become more commonplace, human passengers may experience discomfort brought about by the unnatural, robotic driving style of robotic vehicles. Since individual human drivers exhibit different idiosyncratic tendencies, preferences, and habits behind the steering wheel (e.g., following distance, sudden vs. gradual braking, sudden vs. gradual acceleration, sharpness of turns, frequency of lane changes, and/or the like), a human driver being transported in a driverless vehicle may conclude that the advantages of autonomous driving (e.g., the opportunity to use one's commute time for a constructive purpose, improvements in safety, etc.) are outweighed by the unnatural quality of the robotic driving style.

SUMMARY

The scope of the present invention is defined solely by the appended claims, and is not affected to any degree by the statements within this summary.

By way of introduction, a method in accordance with the present teachings includes: (a) downloading, by a processor, at least a portion of a driving profile to a vehicle, wherein the vehicle is configured for autonomous driving and wherein the driving profile is associated with a specific driver; and (b) executing, by the processor, one or a plurality of operating instructions prescribed by the driving profile, such that the vehicle is operable in a driving style imitative of the specific driver.

An apparatus in accordance with the present teachings includes at least one processor and at least one memory including computer program code for one or more programs. The at least one memory and the computer program code are configured to, with the at least one processor, cause the apparatus to perform at least the following: (a) download at least a portion of a driving profile to a vehicle, wherein the vehicle is configured for autonomous driving and wherein the driving profile is associated with a specific driver; and (b) execute one or a plurality of operating instructions prescribed by the driving profile, such that the vehicle is operable in a driving style imitative of the specific driver.

A non-transitory computer readable storage medium in accordance with the present teachings has stored therein data representing instructions executable by a programmed processor. The storage medium includes instructions for (a) downloading at least a portion of a driving profile to a vehicle, wherein the vehicle is configured for autonomous driving and wherein the driving profile is associated with a specific driver; and (b) executing one or a plurality of operating instructions prescribed by the driving profile, such that the vehicle is operable in a driving style imitative of the specific driver.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 shows a bar graph indicating levels of driverless car automation.

FIG. 2 shows a schematic illustration of an example of cloud-based personalized driving.

FIG. 18 shows a schematic illustration of an exemplary link-by-link comparison between a predefined expected driving behavior (EDB) and a true driving behavior (TDB) associated with an exemplary individual or roadway segment.

DETAILED DESCRIPTION

Figure 3A:
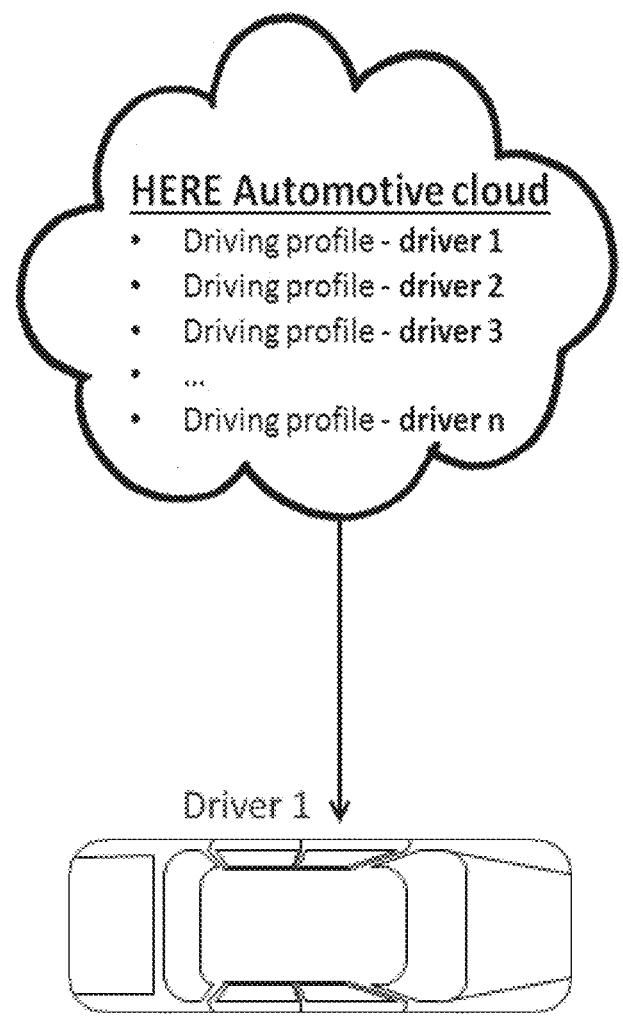
FIG. 3A shows a schematic illustration of an example of downloading an entire driving profile from an automotive cloud to a vehicle.

Different individuals exhibit different habits, preferences, and/or tendencies when driving a vehicle. By way of example, driving styles may vary in the manner of taking turns, the manner of accelerating and/or braking, the preferred following distances maintained behind other vehicles, the positioning within a lane, the preferred lane of travel (e.g., left lane, middle lane, right lane), the use of accessories (e.g., headlights, turn signals, windshield wipers, defrosters, etc.) and/or the like. Since a human occupant may feel more comfortable being transported in a driverless car that drives similarly to how the human would normally drive in a corresponding manual vehicle—as compared to a driverless car that drives haphazardly like a robot—methods and apparatuses for the personalized driving of autonomous vehicles have been discovered and are described herein.

As described herein, personalized driving of an autonomous vehicle in accordance with the present teachings includes downloading all or a portion of a driving profile—which, in some embodiments, may be stored in an automotive cloud—to the autonomous vehicle, and executing one or more operating instructions prescribed by the driving profile that cause the autonomous vehicle to exhibit personalized driving. As used herein, the phrase "personalized driving" refers to a configuration of an autonomous vehicle wherein the vehicle may drive in a style that mimics the idiosyncratic driving style of a specific individual (e.g., "Bob," "Mary," etc.) and/or a stereotypical driving style associated with a hypothetical generic driver (e.g., a "cautious" driver, an "impatient" driver, a driver transporting breakable cargo, an ambulance driver, a police officer, etc.).

Personalized driving in accordance with the present teachings may be used in connection with autonomous vehicles characterized by different levels of automation. FIG. 1 shows a bar graph summarizing five different levels of automation that are contemplated for use in accordance with the present teachings. These levels, in order of increasing automation, are as follows: (1) "manual" (e.g., a driver controls the vehicle completely at all times); (2) "assisted" (e.g., a driver partially delegates control but monitors the system constantly and is ready to assume full control); (3) "partially automated" a.k.a., "hands-on" (e.g., a driver fully delegates control but monitors the system constantly and is ready to assume full control); (4) "highly automated" a.k.a. "hands off" (e.g., a driver is prepared to take control if a warning is issued; and (5) "fully automated" (e.g., the vehicle takes over completely and driver monitoring by a human passenger—if indeed one is present—is optional and unnecessary). In some embodiments, personalized driving in accordance with the present teachings is contemplated for use with autonomous vehicles having a level of automation ranging from "assisted" through "fully automated." However, an autonomous vehicle having a level of automation ranging from "assisted" through "fully automated" may be further configured for optional "manual" operation at the discretion of its user.

It is to be understood that elements and features of the various representative embodiments described below may be combined in different ways to produce new embodiments that likewise fall within the scope of the present teachings.

By way of general introduction, a method for personalized driving of autonomously driven vehicles in accordance with the present teachings includes: (a) downloading at least a portion of a driving profile to a vehicle, wherein the vehicle is configured for autonomous driving and wherein the driving profile is associated with a specific driver; and (b) executing one or a plurality of operating instructions prescribed by the driving profile, such that the vehicle is operable in a driving style imitative of the specific driver. As used herein, the term "vehicle" includes all manner of transportation machines including but not limited to cars, trucks, motorcycles, mopeds, scooters, bicycles, tractors, riding lawn mowers, snowmobiles, boats, self-balancing personal transports, and/or the like, and combinations thereof.

In some embodiments, the driving profile is stored in an "automotive cloud" from which all or a portion of the driving profile may be downloaded to the vehicle (e.g., to an onboard memory of the vehicle). As used herein, the phrase "automotive cloud" refers to a cloud-based storage system. In some embodiments, a cloud-based storage system includes one or a plurality of remote servers. In some embodiments, the automotive cloud is configured for transmitting data to and/or receiving data from the vehicle. In some embodiments, the transmitting and/or receiving may be achieved wirelessly. In other embodiments, the driving profile is stored in a portable storage device (e.g., a memory stick, a CD, a DVD, and/or the like) that may be connected directly to the vehicle in order to effect transfer of data.

In some embodiments, the downloaded portion of the driving profile represents less than an entirety of the driving profile that is stored in the automotive cloud (e.g., only a portion of the driving profile). In such embodiments, the downloaded portion may be constrained by a variable that is related to the vehicle and/or an environment of the vehicle. For example, in some embodiments, the variable is selected from the group consisting of a geographical location, a type of road, a type of terrain, a type of weather, a type of season, a time of day, a degree of visibility, a volume of traffic, a priority of travel purpose, and/or the like, and combinations thereof. Moreover, for embodiments in which only a portion of the driving profile is downloaded, methods in accordance with the present teaching may further include (c) refreshing a content of the downloaded portion based on a spatial change (e.g., location, elevation, etc.) and/or a temporal change (e.g., time, elapsed time, etc.). In other embodiments, the driving profile stored in the automotive cloud is downloaded to the vehicle substantially in its entirety.

In some embodiments, a method in accordance with the present teachings further includes (d) receiving identification information for the specific driver from which the driving profile may be determined. For example, in some embodiments, the vehicle may be provided with an authentication console or user interface (UI) configured to accept login credentials and/or other identifying information from the driver. By way of example, representative UIs for use in accordance with the present teachings include but are not limited to keyboards (e.g., for entering log-in information such as username/password), touchscreens, fingerprint scanners, retinal scanners, voice recognition devices, facial recognition devices, and/or the like, and combinations thereof. After authentication, the automotive cloud is aware of the driver.

In some embodiments, the driver may have a plurality of driving profiles, and the driving profile downloaded to the vehicle represents only one of the plurality of stored driving profiles associated with the specific driver. By way of example, the driver may have a driving profile for driving a car and a separate driving profile for driving a truck. Thus, in some embodiments, methods in accordance with the present teachings further include (e) selecting which of the plurality of stored driving profiles to access. In some embodiments, this selection is based on data transmitted to the automotive cloud. For example, the driver may request that the driving profile specific to truck driving is selected. Alternatively, identifying information received from the autonomous vehicle itself may indicate the type of vehicle and, consequently, the type of driving profile to select. In such a way, if a driver is to be transported, for example, in an autonomously driven truck, the truck may be autonomously driven in the manner that the driver would manually drive a truck as opposed to a car.

In some embodiments, methods in accordance with the present teachings further include (f) determining whether a driving profile currently exists for the specific driver. For example, if a driver has not previously been associated with any driving profile (e.g., a new driver whose driving profile is not in the automotive cloud), or if the driver's driving profile is currently inaccessible for some reason, a new driving profile may be created. In some embodiments, the in-vehicle automotive cloud technology may be configured to detect that the driver is new, create a new driving profile, and then archive the driving profile in the automotive cloud. If the driver is new, an attempt may initially be made to categorize the new driver (e.g., based on the new driver's current driving patterns) into an existing driving profile pattern archived in the automotive cloud. If no match is made, profile construction for the driver may be initiated.

In some embodiments, the vehicle to which the driving profile is downloaded includes a plurality of vehicles, each of which is configured for autonomous driving. In such embodiments, each of the plurality of vehicles may be configured to drive in the same style. Thus, in some embodiments, one single driving profile may be downloaded from the automotive cloud to a plurality of autonomously driven vehicles. For example, each vehicle in a fleet of vehicles may be configured to drive autonomously in the same manner (e.g., a manner that is imitative of the driving style of a specific driver) since each of the vehicles utilizes the same driving profile. As such, the fleet of vehicles may be configured to participate in a platooning trip.

In some embodiments, the driving profile is not associated with a specific individual per se but rather represents a generic and/or composite profile of a specific type of driver. For example, the generic profile may be associated with a specific driving category (e.g., "cautious" drivers, "impatient" drivers, "aggressive" drivers, "alert" drivers, "courteous" drivers, "selfish" drivers, drivers transporting oversized and/or breakable cargo, ambulance drivers, police offers, and/or the like). For such embodiments, methods in accordance with the present teachings may further include (g) matching the specific driver to the specific driving category (e.g., based on data collected during an initial analysis phase of the driver's driving style). In some embodiments, the data collected is obtained, at least in part, from telematics sensor data.

In some embodiments, methods in accordance with the present teachings further include (h) modifying the driving profile. For example, a driver profile stored in an automotive cloud may be updated—automatically or manually—by the collection of additional sensor data indicative of the driving style of the specific driver. The more driving samples that are collected per driver, the more accurately the driving behavior of that driver may be modeled. In some embodiments, methods in accordance with the present teachings further include (i) deleting the driving profile. For example, the driving profile may be deleted from the automotive cloud and/or the vehicle memory—either automatically (e.g., after a predefined period of time, etc.) or manually (e.g., at the request of the driver, after completion of a trip, etc.).

In some embodiments—for example, if a determination is made that the driving profile does not already exist—methods in accordance with the present teachings further include (j) constructing the driving profile. As further explained below, methods for constructing a driving profile in accordance with the present teachings may include acquiring telematics sensor data from one or a plurality of telematics sensors (e.g., differential GPS a.k.a. D-GPS, windshield wiping sensors, laser sensors, camera sensors, microphone sensors, shift sensors, pedal sensors, lever sensors, speed sensors, headlamp sensors, steering wheel sensors, and/or the like) onboard the vehicle; accessing real world reference data (e.g., from a 3D map); acquiring real time environmental data corresponding to a status of an environment of the vehicle (e.g., weather, traffic, incidents, and/or the like); and (iv) modeling the driving profile based on at least a portion of the telematics sensor data, at least a portion of the real world reference data, and at least a portion of the real time environmental data.

Figure 5:
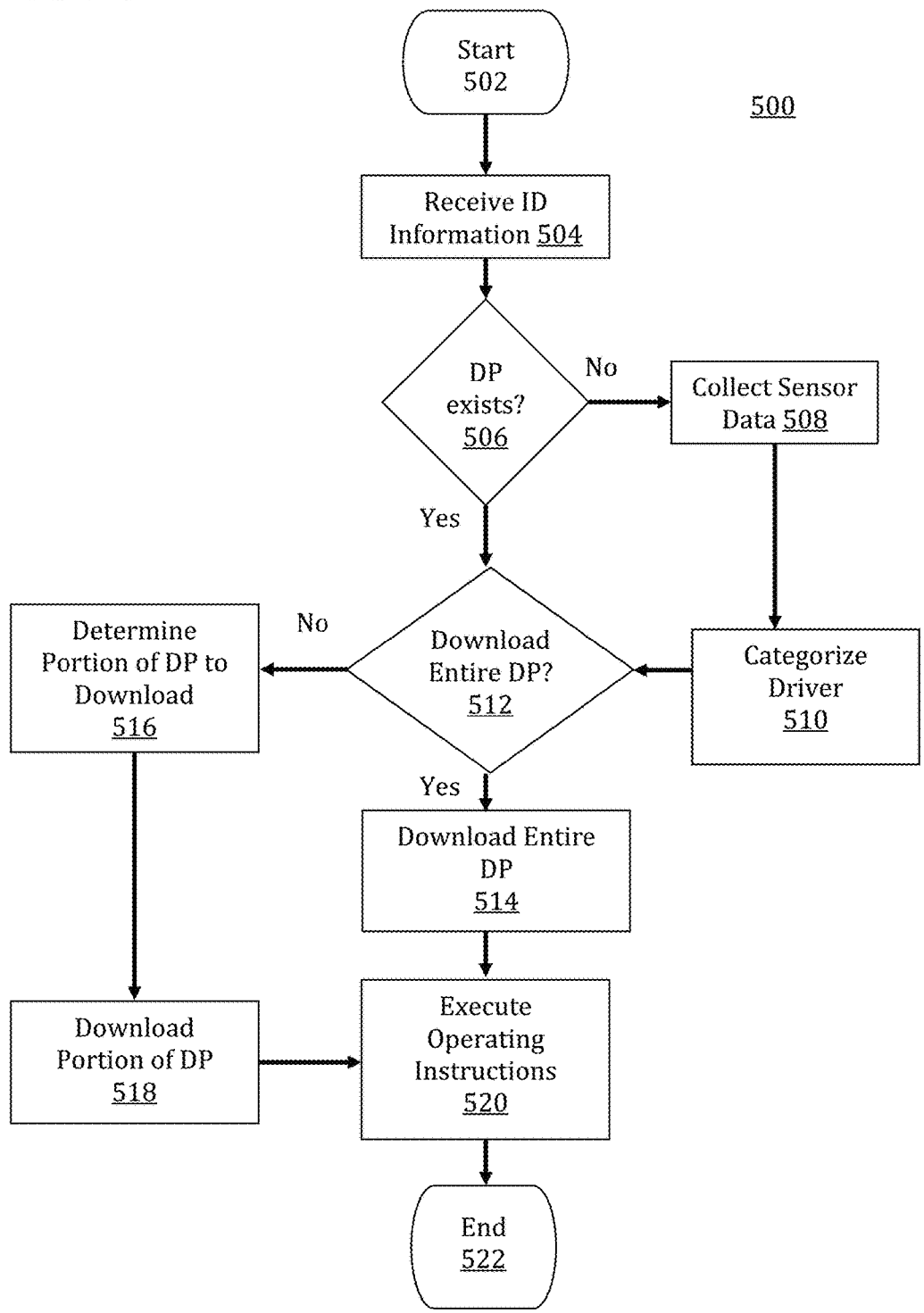
FIG. 5 shows a flow chart of an exemplary process for personalized driving of an autonomously driven vehicle.

FIG. 5 shows a flow chart of a representative method 500 for personalized driving of an autonomously driven vehicle in accordance with the present teachings. As shown in FIG. 5, the method 500 begins at block 502 and may include receiving 504 login and/or identification information from a user (e.g., through an interface and/or an identity authentication procedure). At decision block 506, a determination is made as to whether a driving profile (DP) already exists in association with the user identified at block 504. If a determination is made that one or more driving profiles already exist in association with the user's identification information, the process may proceed to decision block 512. If, however, a determination is made that no DP currently exists and/or that an existing DP is invalid and/or otherwise inaccessible, the process may proceed to block 508. At block 508, the driver may be monitored for a period of time during which sensor data indicative of the driver's driving style is collected. When a predefined amount of data is collected (e.g., an amount sufficient to categorize the driver), the data may be used at block 510 to categorize the driver into a driving category. At this point, the process may proceed to decision block 512.

At decision block 512, a determination is made as to whether or not to download an entire DP. If an entire DP is to be downloaded, the process may proceed to block 514 and the entire DP may be downloaded to the vehicle. After downloading, the process may proceed to block 520 and operating instructions prescribed by the DP may be executed. If, however, only a portion of a DP is to be downloaded, the process may proceed to block 516 and a determination made as to which portion of the DP to download. Once this determination is made, the process may proceed to block 518 and the designated portion of the DP may be downloaded to the vehicle. After downloading, the process may proceed to block 520 and operating instructions may be executed.

In some embodiments, the DP downloaded to the vehicle may be unique to the specific driver. In other embodiments—such as when a DP does not currently exist but the driver has been categorized, as at block 510—the DP downloaded to the vehicle may be a generic and/or composite profile representative of a hypothetical type of driver.

It is to be understood that the relative ordering of some acts shown in the flow chart of FIG. 5 is meant to be merely representative rather than limiting, and that alternative sequences may be followed. Moreover, it is likewise to be understood that additional, different, or fewer acts may be provided, and that two or more of these acts may occur sequentially, substantially contemporaneously, and/or in alternative orders. By way of example, in some embodiments (e.g., in which a specific driver has a plurality of driving profiles), a further act (not shown) may include determining which of the plurality of driving profiles (e.g., truck, car, etc.) to download for a given situation. In some embodiments, this additional act may fall between decision block 506 and decision block 512. In other embodiments, this additional act may follow decision block 512. By way of further example, in some embodiments (e.g., when only a portion of DP is downloaded), the process may further include an additional act (not shown) whereby the downloaded content is refreshed. In some embodiments, this additional act may fall between block 520 and end block 522.

In some embodiments, a method in accordance with the present teachings for personalized driving of autonomously driven vehicles is implemented using a computer and, in some embodiments, one or a plurality of the above-described acts are performed by one or a plurality of processors. In some embodiments, one or more of the one or the plurality of processors include graphics processing units (GPUs). In other embodiments, one or more of the one or the plurality of processors include central processing units (CPUs). In some embodiments, methods in accordance with the present teachings are implemented entirely on GPUs. In some embodiments, GPUs provide improved and/or faster performance.

In some embodiments, as described above, the present teachings provide methods for personalized driving of autonomously driven vehicles. In other embodiments, as further described below, the present teachings also provide apparatuses for personalized driving of autonomously driven vehicles.

Figure 13:
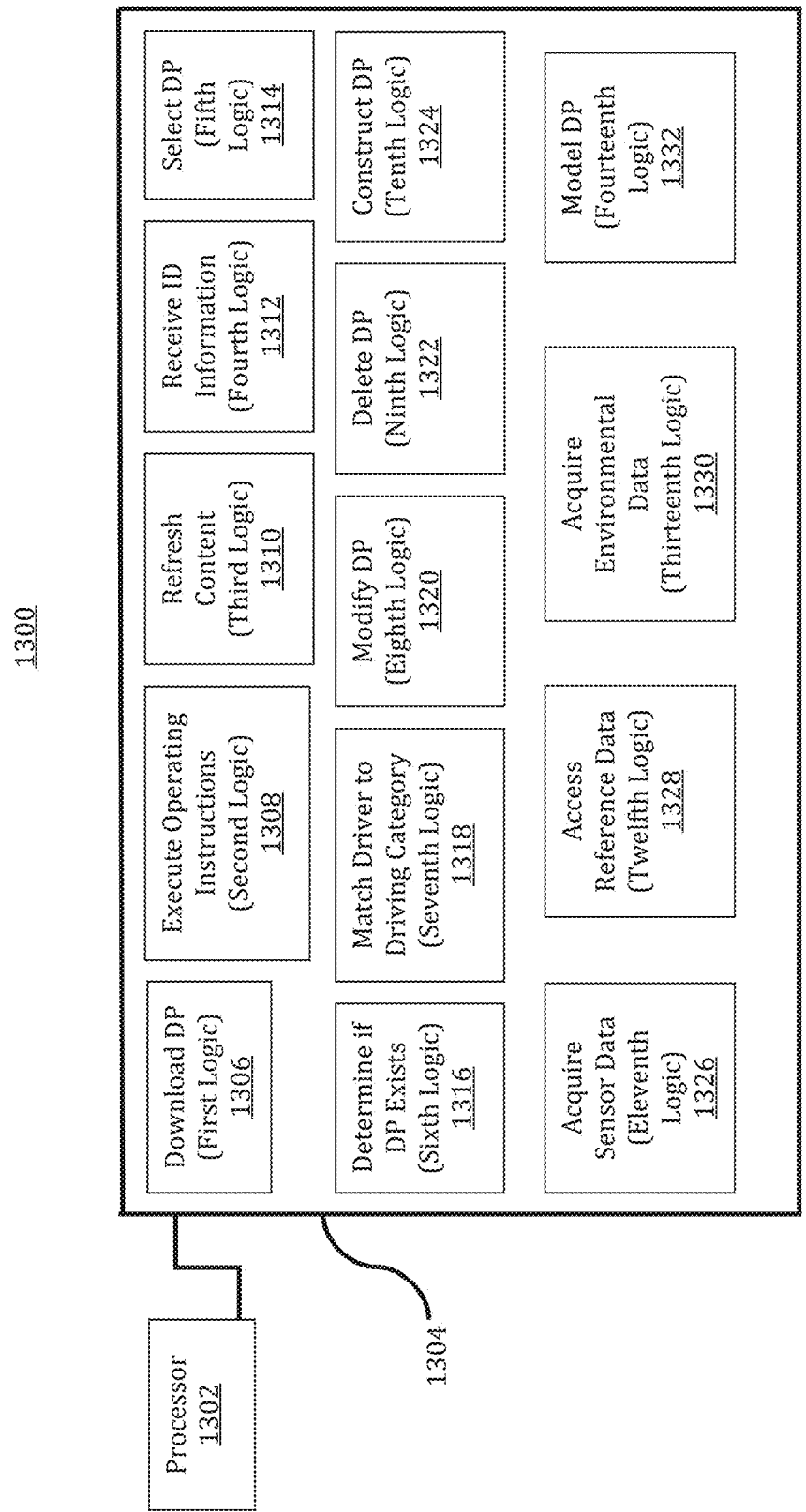
FIG. 13 shows a block diagram of a representative apparatus 1300 in accordance with the present teachings for personalized driving of an autonomously driven vehicle.

FIG. 13 shows a block diagram of a representative first apparatus 1300 in accordance with the present teachings for personalized driving of autonomously driven vehicles. In some embodiments, as shown in FIG. 13, an apparatus 1300 in accordance with the present teachings is implemented as part of a GPU in a computer system. In other embodiments, the apparatus 1300 may be implemented as part of a CPU in a computer system.

In some embodiments, as shown in FIG. 13, the apparatus 1300 may include: a processor 1302; a non-transitory memory 1304 coupled with the processor 1302; first logic 1306 stored in the non-transitory memory 1304 and executable by the processor 1302 to cause the apparatus 1300 to download at least a portion of a driving profile to a vehicle, wherein the vehicle is configured for autonomous driving and wherein the driving profile is associated with a specific driver; second logic 1308 stored in the non-transitory memory 1304 and executable by the processor 1302 to cause the apparatus 1300 to execute one or a plurality of operating instructions prescribed by the driving profile, such that the vehicle is operable in a driving style imitative of the specific driver; third logic 1310 stored in the non-transitory memory 1304 and executable by the processor 1302 to cause the apparatus 1300 to refresh a content of the downloaded portion based on a spatial change and/or a temporal change; and fourth logic 1312 stored in the non-transitory memory 1304 and executable by the processor 1302 to cause the apparatus 1300 to receive identification information for the specific driver from which the driving profile associated with the specific driver may be determined.

In some embodiments, the apparatus 1300 may further include one or more of the following: fifth logic 1314 stored in the non-transitory memory 1304 and executable by the processor 1302 to cause the apparatus 1300 to select which of the plurality of stored driving profiles to access; sixth logic 1316 stored in the non-transitory memory 1304 and executable by the processor 1302 to cause the apparatus 1300 to determine whether a driving profile currently exists for the specific driver; seventh logic 1318 stored in the non-transitory memory 1304 and executable by the processor 1302 to cause the apparatus 1300 to match the specific driver to the specific driving category; eighth logic 1320 stored in the non-transitory memory 1304 and executable by the processor 1302 to cause the apparatus 1300 to modify the driving profile; ninth logic 1322 stored in the non-transitory memory 1304 and executable by the processor 1302 to cause the apparatus 1300 to delete the driving profile; tenth logic 1324 stored in the non-transitory memory 1304 and executable by the processor 1302 to cause the apparatus 1300 to construct the driving profile; eleventh logic 1326 stored in the non-transitory memory 1304 and executable by the processor 1302 to cause the apparatus 1300 to acquire telematics sensor data from one or a plurality of telematics sensors onboard the vehicle; twelfth logic 1328 stored in the non-transitory memory 1304 and executable by the processor 1302 to cause the apparatus 1300 to access real world reference data; thirteenth logic 1330 stored in the non-transitory memory 1304 and executable by the processor 1302 to cause the apparatus 1300 to acquire real time environmental data corresponding to a status of an environment of the vehicle; and/or fourteenth logic 1332 stored in the non-transitory memory 1304 and executable by the processor 1302 to cause the apparatus 1300 to model the driving profile based on at least a portion of the telematics sensor data, at least a portion of the real world reference data, and at least a portion of the real time environmental data.

In some embodiments, the apparatus 1300 is configured as a device selected from the group consisting of autonomous vehicles, navigation systems, mobile phones, personal computers, game consoles, laptops, notebooks, tablets, portable media players, personal digital assistants, pagers, and the like, and combinations thereof. In some embodiments, the apparatus 1300 is configured as an autonomous vehicle and further includes: (a) user interface circuitry and user interface software configured to (i) facilitate user control of at least some functions of the autonomous vehicle though use of a display and (ii) respond to user inputs; and (b) a display and display circuitry configured to display at least a portion of a user interface of the autonomous vehicle, the display and the display circuitry configured to facilitate user control of at least some of the functions of the autonomous vehicle.

A non-transitory computer-readable storage medium in accordance with the present teachings has stored therein data representing instructions executable by a programmed processor for personalized driving of autonomously driven vehicles. The storage medium includes instructions for: (a) downloading at least a portion of a driving profile to a vehicle, wherein the vehicle is configured for autonomous driving and wherein the driving profile is associated with a specific driver; and (b) executing one or a plurality of operating instructions prescribed by the driving profile, such that the vehicle is operable in a driving style imitative of the specific driver.

As described above, personalized driving of an autonomous vehicle in accordance with the present teachings includes downloading all or a portion of a driving profile to the autonomous vehicle, and executing one or more operating instructions prescribed by the driving profile that cause the autonomous vehicle to exhibit personalized driving. However, a user may accidentally or deliberately select a driving profile (e.g., the user's own driving profile, a driving profile specific to a different user, or a generic profile) that may in fact be inappropriate (e.g., dangerous) in view of actual roadway conditions. By way of example, a user who is late for an appointment may select a driving style associated with a race car driver in the hopes of reaching a desired destination as quickly as possible. In actuality, the selected profile may in fact prove too dangerous for the actual environmental conditions (e.g., icy roads, heavy rain, dense fog, etc.), roadway (e.g., narrow and/or curvy roads, etc.), traffic patterns (e.g., rush hour congestion, etc.), and/or the like. To address this and/or analogous situations, a further aspect of methods in accordance with the present teachings will now be described.

By way of introduction, a method in accordance with the present teachings for communicating a ranking characterizing a portion of a roadway includes: (a) ranking at least one segment of a roadway based on an amount of deviation between a true driving behavior (TDB) on the at least one segment of the roadway and an expected driving behavior (EDB) predefined for the at least one segment of the roadway; and (b) communicating the ranking to a client.

As used herein, the phrase "expected driving behavior" refers to a predefined value or range of values characterizing one or a plurality of driving attributes/parameters that may be used to characterize travel on a given segment of a roadway. Representative parameters that may be used to define an EDB include but are not limited to speed, direction, acceleration, sinuosity (e.g., the degree of weaving associated with a vehicle's forward trajectory), and/or the like, and combinations thereof. As used herein, the phrase "true driving behavior" refers to actual values (e.g., historical and/or real time) of the one or more parameters constituting the EDB.

As used herein the term "client" refers broadly to any type of mobile device (e.g., a vehicle and/or a component thereof, including but not limited to a navigation systems, an onboard computer, and/or the like; a mobile phone; and/or the like). In some embodiments, the mobile device is configured to be under at least partial manual control by a human user (e.g., a navigation system aboard a vehicle that is configured for at least occasional manual driving). In other embodiments, the mobile device includes an autonomously driven vehicle that may or may not include any human passenger.

In some embodiments, the roadway includes a plurality of segments. In some embodiments, these segments are substantially equal in length. In other embodiments, one or more of the segments may differ in length. In some embodiments, the plurality of segments, taken together, characterizes a contiguous stretch of the roadway.

In some embodiments, the communicating of ranking to a client may include visually displaying the ranking (e.g., on a mobile device and/or the like). By way of example, the ranking may be displayed via a navigation system, a mobile phone, a tablet, a projection (e.g., onto a windshield, dashboard, console, and/or other surface of a vehicle, etc.), or the like, and combinations thereof. In some embodiments, the ranking includes color-coding the amount of deviation. For example, a first segment of a roadway having a high amount of deviation between TDB and EDB (e.g., at or above a predefined first threshold) may be colored red on a map. Similarly, by way of further example, a second segment of a roadway having a moderate amount of deviation between TDB and EDB (e.g., within a predefined range) may be colored yellow on a map. Furthermore, by way of further example, a third segment of a roadway having a low amount of deviation between TDB and EDB (e.g., at or below a second threshold) may be colored green on a map.

In some embodiments, the communicating of ranking to a client may comprise aurally communicating information concerning a segment of a roadway to the user (e.g., through a user interface). In some embodiments, the user may interact with an artificial intelligence (e.g., an intelligent personal assistant or the like) to request that certain information be repeated, to request alternate information, and/or the like using, for example, a voice command device and/or the like.

In some embodiments, the client includes an autonomously operated vehicle, and the communicating includes transmitting to a computer processor aboard the autonomously operated vehicle a driving instruction that is derived from analysis of the ranking. However, it should be noted that methods and apparatuses in accordance with the present teachings for communicating a ranking characterizing a portion of a roadway are not restricted to use in autonomous vehicles. In some embodiments, the methods and apparatuses may be implemented in a navigation system that may be used onboard all manner of manually and/or autonomously driven vehicles.

In some embodiments, a method for communicating a ranking characterizing a portion of a roadway in accordance with the present teachings further includes issuing an alert to the client if the amount of deviation exceeds a predefined threshold. However, since different users may have different tolerances and/or preferences for the amount of deviation, a method in accordance with the present teachings may further include selecting a personalized threshold below which the alert is not issued to the client.

In some embodiments, the TDB is determined based on historical data for the segment of the roadway. For example, data over a preceding three- to five-year period may be used in assessing the TDB exhibited on a particular segment of a roadway. In other embodiments, the TDB is determined based on real time data for the segment of the roadway. For example, data collected from onboard telematics sensors, cameras, and/or the like may be used in assessing the TDB at a particular time. In some embodiments, TDB may be determined based on a combination of historical data and real time data.

In some embodiments, a method for communicating a ranking characterizing a portion of a roadway in accordance with the present teachings further includes one or more of the following: partitioning the roadway into a plurality of links; defining the EDB for each of the plurality of links; determining the true driving behavior TDB for each of the plurality of links; and/or comparing the TDB and the expected driving behavior EDB for each of the plurality of links.

In some embodiments, a method in accordance with the present teachings for communicating a ranking characterizing a portion of a roadway is implemented using a computer and, in some embodiments, one or a plurality of the above-described acts are performed by one or a plurality of processors.

In some embodiments, as described above, the present teachings provide methods for communicating a ranking characterizing a portion of a roadway. In other embodiments, as further described below, the present teachings also provide apparatuses for communicating a ranking characterizing a portion of a roadway.

Figure 15:
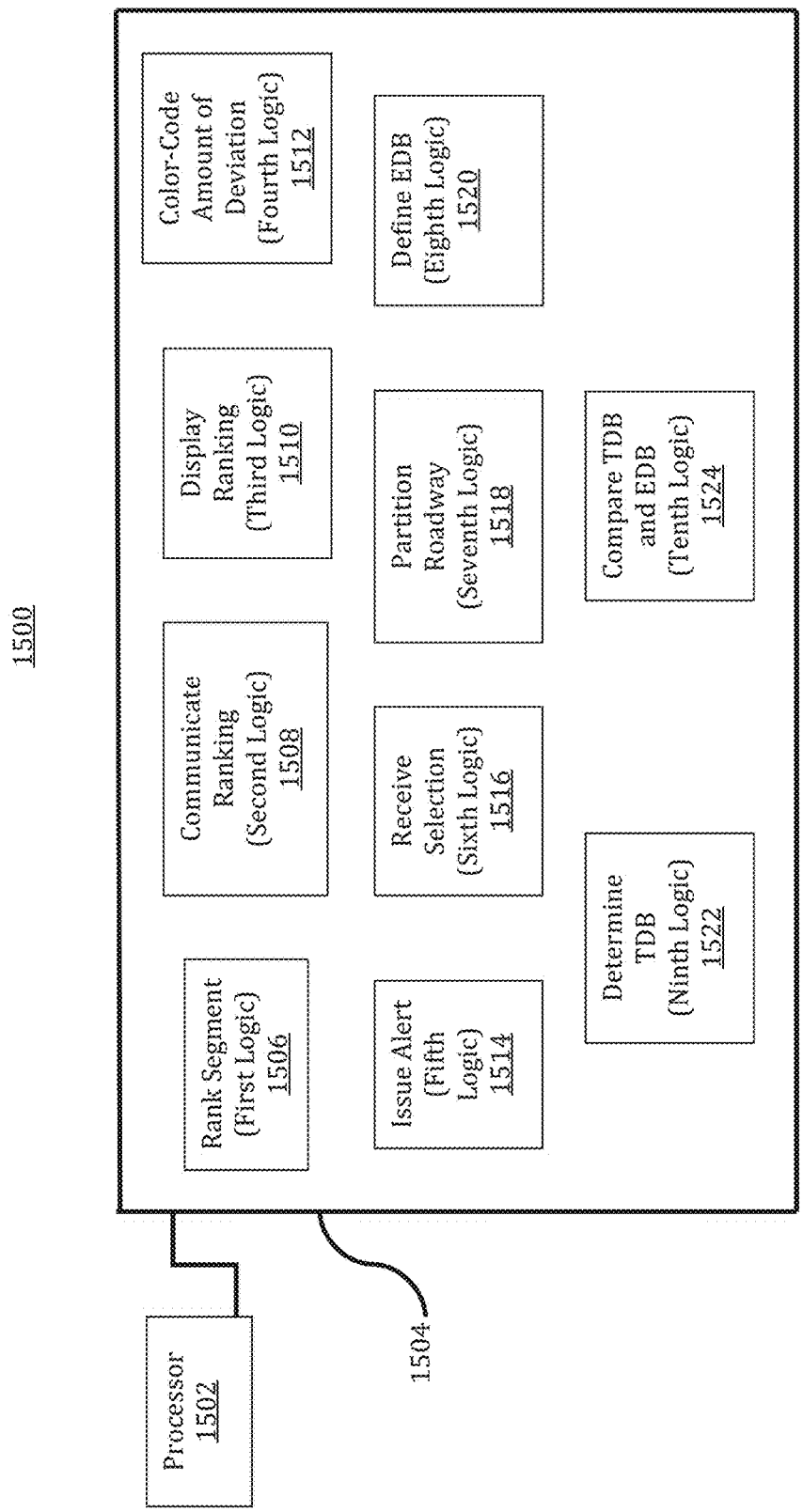
FIG. 15 shows a block diagram of a representative apparatus 1500 in accordance with the present teachings for communicating a ranking characterizing a portion of a roadway.

FIG. 15 shows a block diagram of a representative apparatus 1500 in accordance with the present teachings for communicating a ranking characterizing a portion of a roadway. In some embodiments, as shown in FIG. 15, an apparatus 1500 in accordance with the present teachings is implemented as part of a GPU in a computer system. In other embodiments, the apparatus 1300 may be implemented as part of a CPU in a computer system.

In some embodiments, as shown in FIG. 15, the apparatus 1500 may include: a processor 1502; a non-transitory memory 1504 coupled with the processor 1502; first logic 1506 stored in the non-transitory memory 1504 and executable by the processor 1502 to cause the apparatus 1500 to rank at least one segment of a roadway based on an amount of deviation between a true driving behavior on the at least one segment of the roadway and an expected driving behavior predefined for the at least one segment of the roadway; and second logic 1508 stored in the non-transitory memory 1504 and executable by the processor 1502 to cause the apparatus 1500 to communicate the ranking to a client.

In some embodiments, the apparatus 1500 may further include one or more of the following: third logic 1510 stored in the non-transitory memory 1504 and executable by the processor 1502 to cause the apparatus 1500 to display the ranking via a navigation system, a mobile phone, a tablet, a projection, or a combination thereof; fourth logic 1512 stored in the non-transitory memory 1504 and executable by the processor 1502 to cause the apparatus 1500 to color-code the amount of deviation; fifth logic 1514 stored in the non-transitory memory 1504 and executable by the processor 1502 to cause the apparatus 1500 to issue an alert to the client if the amount of deviation exceeds a predefined threshold; sixth logic 1516 stored in the non-transitory memory 1504 and executable by the processor 1502 to cause the apparatus 1500 to receive a selection of a personalized threshold below which the alert is not issued to the client; seventh logic 1518 stored in the non-transitory memory 1504 and executable by the processor 1502 to cause the apparatus 1500 to partition the roadway into a plurality of links; eighth logic 1520 stored in the non-transitory memory 1504 and executable by the processor 1502 to cause the apparatus 1500 to define the EDB for each of the plurality of links; ninth logic 1522 stored in the non-transitory memory 1504 and executable by the processor 1502 to cause the apparatus 1500 to determine the TDB for each of the plurality of links; and/or tenth logic 1524 stored in the non-transitory memory 1504 and executable by the processor 1502 to cause the apparatus 1500 to compare the true driving behavior and the expected driving behavior for each of the plurality of links.

The following description and representative implementations illustrate features in accordance with the present teachings, and are provided solely by way of illustration. They are not intended to limit the scope of the appended claims or their equivalents.

In some embodiments, an autonomous vehicle may be configured to drive only as its owner. For example, an autonomous vehicle may be configured to autonomously drive at the average speed of the vehicle's owner, autonomously take sharp turns similar to how the owner would turn, autonomously drive in a given weather condition as the owner would drive, and/or the like. In some embodiments, an autonomous vehicle may be further configured to drive as one or more other individuals in addition to or alternatively to the vehicle's owner. These other individuals may or may not be restricted and may or may not require pre-authorization in order to drive the owner's vehicle. For example, the default driving profile in Driver A's autonomous vehicle may be associated with Driver A. However, if Driver B wants to be driven in Driver A's autonomous vehicle and is able to establish driving privileges (e.g., by passing an authentication procedure), Driver B's driving profile may be downloaded (e.g., from an automotive cloud, from a portable memory device, and/or the like) to Driver A's car and Driver A's car may be configured to drive like Driver B. In some embodiments, an autonomous vehicle may be configured to drive as any specific or generic driver without restriction (e.g., an autonomous rental vehicle may be configured to drive as any individual who rents it). In some embodiments, an autonomous vehicle may be configured to allow a visually impaired driver to drive using a non-visually impaired driver's driving profile.

In a conventional driver assistance system, sensor information may indicate the windshield wipers are off whereas current weather conditions may indicate that it is raining. Thus, a conventional driver assistance system may automatically activate the windshield wipers. By contrast, in accordance with the present teachings, the windshield wipers would not be activated unless the driving profile for a given driver prescribes that the driver would activate windshield wipers in an analogous weather situation (e.g., some drivers do not activate windshield wipers unless rain is severe). In addition, the control setting of the windshield wipers, once activated, may correspond to the preferred setting of the driver in an analogous weather situation.

Whereas a conventional driver assistance system may continue to sense the driver at all times while the car is driving, a system in accordance with the present teachings may not. Rather, once the driving profile has been constructed and downloaded from the automotive cloud to the vehicle, the vehicle may drive itself without sensing the driver and/or any other passengers.

In some embodiments, personalized driving of autonomously driven vehicles in accordance with the present teachings may be used to drive a vehicle autonomously similarly to how a given driver may be expected to drive the vehicle on a road that was not previously travelled by the driver and/or on a road from which no data used in constructing the driving profile was previously collected.

In some embodiments, personalized driving of autonomously driven vehicles in accordance with the present teachings may be used to drive a vehicle autonomously similarly to how a given driver may be expected to drive the vehicle even if the driver has not previously driven that specific type of vehicle.

In some embodiments, driving behavior may be modeled using a combination of the following pieces of information: (a) 3D map that includes information regarding curvature, slope, lane level information (e.g. width), road bank angle, and/or the like; (b) real time weather data; (c) real time telematics sensor data (e.g., transmitted from the vehicle to the automotive cloud as the driver is travelling); and (d) real time traffic and incident data.

FIG. 2 shows a high level schematic overview of an example of cloud-based personalized driving. As shown in FIG. 2, driving profiles may be archived in the automotive cloud 200. Each car has a wireless connection 202 to the automotive cloud 200, thereby facilitating duplex communication therebetween. As shown in FIG. 2, drivers with archived driving profiles (e.g. driver 1 and driver 2) may download their respective profiles from the automotive cloud 200 to any driverless car. As further shown in FIG. 2, no driving profile currently exists for driver 0. Thus, a driving profile creation instruction may be initiated.

Drivers 1 and 2 may modify their driving profiles manually and/or autonomously. For example, if all of the collected data that was used to construct the driving profile for driver 1 was collected when the road was free of snow, the driving profile associated with driver 1 may be modified based on additional data collected when the road includes snow coverage. In some embodiments, driver 1 may manually trigger further data collection. Alternatively or in addition, the system may automatically sense that data for a current weather condition (e.g., snow on the road) does not yet exist, thereby automatically activating driving profile modification.

In some embodiments, a driving profile in accordance with the present teachings corresponds to a description of how the driver actually drives. In other embodiments, a driving profile in accordance with the present teachings corresponds to a description of how the driver wants an autonomous vehicle to drive. For example, in some embodiments, personalized driving of an autonomous vehicle may include a driving style that the driver is comfortable with only if it is executed by an autonomous vehicle. In other words, in some embodiments, a driver may not necessarily want an autonomous vehicle to drive like the driver per se, but rather would like to personalize the driverless strategy. For example, while a driver might manually drive at a speed of only 40 mph at night due to poor night vision on the part of the driver, the driver might be comfortable traveling in an autonomous vehicle traveling at 60 mph since the car has multiple sensors and a shorter reaction time. Similarly, while a driver might manually drive at a lesser speed due to the age and/or condition of a manually operated vehicle, the driver might trust a newer, high performance autonomous vehicle to travel at higher speeds.

Autonomous vehicles may drive at faster speeds than human drivers while remaining safe, which a driver may choose to factor into a personalized driving strategy. For example, while the driver may not risk manually overtaking a car ahead in a limited space, the driver may trust the autonomous vehicle car to do so safely. In some embodiments, a personalized driving strategy for the autonomous vehicle may be established through one or more guidelines for the autonomous vehicle (e.g., never exceed 200 mph, attempt to overtake only in certain conditions, and/or the like).

Figure 3B:
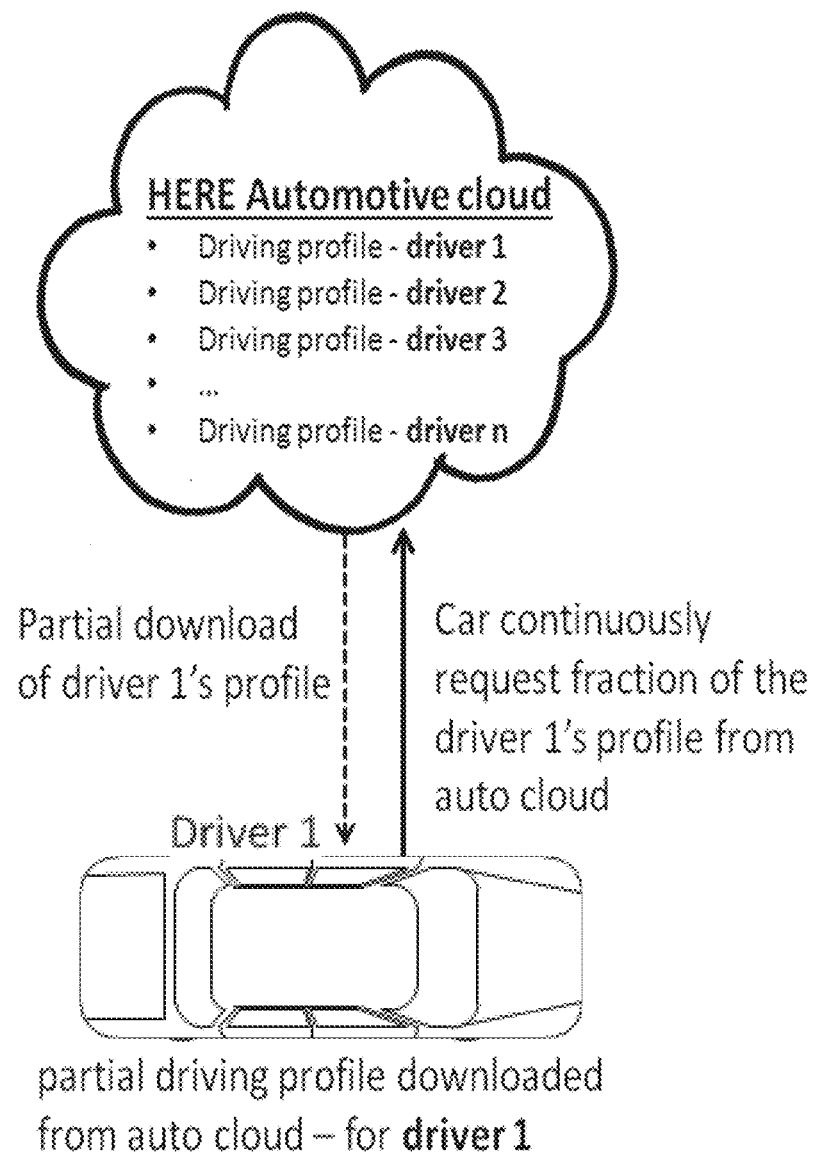
FIG. 3B shows a schematic illustration of an example of a partial download of a driving profile from an automotive cloud to a vehicle.

After entering an autonomous vehicle, a driver may be authenticated by sending information to an authentication service. After authentication, the system may determine whether a valid driving profile exists for the driver by using the authentication credential and/or the vehicle category (e.g., car or truck). If a valid driving profile is found to exist in the automotive cloud, the driving profile may be downloaded and cached on the vehicle. In some embodiments, as shown in FIG. 3A, the entire driving profile may be transferred from the automotive cloud to the vehicle. In other embodiments, as shown in FIG. 3B, the driving profile may be fed piecewise to the vehicle as time progresses and as the environment changes (e.g., as determined by telematics sensors on the vehicle). Based on the downloaded driving profile, the vehicle autonomously executes operating instructions prescribed by the driving profile and drives with or without limited human interference.

For embodiments in which only a portion of the driving profile is downloaded, as in FIG. 3B, the fraction that is downloaded may be determined based on spatial and temporal properties of the environment and/or the vehicle. For example, if it is raining, only that portion of the driving profile that reflects how the driver drives in rainy conditions may be downloaded from the automotive cloud to the vehicle. Other portions reflecting, for example, how the driver drives in snowy or non-rainy conditions may not be downloaded.

Representative methods for constructing a driving profile in accordance with the present teachings may include collecting training data in an initial phase, and then using the training data as an inference engine in a subsequent phase. By way of example, in a first phase of driving profile construction, telematics sensor data from a vehicle may be collected for a candidate driver. This telematics sensor data may be fused with other information including but not limited to information obtained from a 3D lane-level map and environmental information (e.g., weather, etc.) to construct a driving profile for the candidate driver. In some embodiments, the driving profile is archived in an automotive cloud. Later, when personalized autonomous driving is desired, the driving profile—or a portion thereof—may be downloaded from the automotive cloud, loaded into the vehicle's memory, and executed. The portion of the driving profile executed by the vehicle is based on current data received from the telematics sensors and other information sources that the telematics sensor data was fused with in the initial inference phase.

Figure 4:
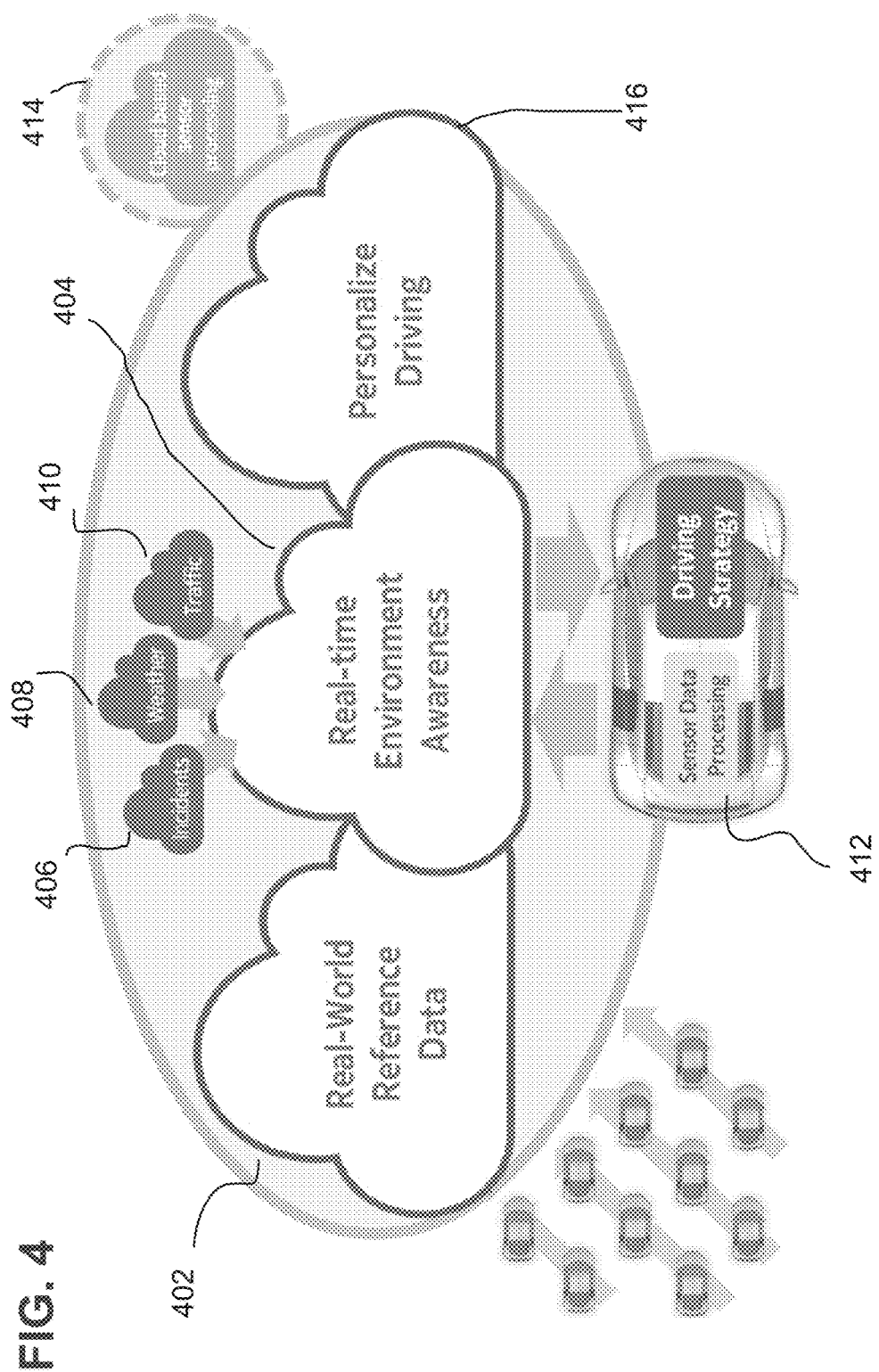
FIG. 4 shows a schematic illustration of an example of a personalized driving model and representative inputs.

FIG. 4 shows a schematic illustration of an example of a personalized driving model and inputs. As shown in FIG. 4, personalized driving of an autonomous vehicle in accordance with the present teachings may be achieved through a combination of the following: (a) real world reference data 402 (e.g., an accurate 3D map); (b) real time environmental status data 404 which, in some embodiments, may include but are not limited to data regarding incidents 406, data regarding weather 408, and/or data regarding traffic 410; (c) onboard vehicle sensor data processing 412 (e.g., processing of some telematics sensor data); (d) cloud-based sensor processing 414; and (3) a driving profile 416 associated with a specific driver. Telematics sensor data may be processed (e.g., onboard the vehicle and/or in the automotive cloud) and aggregated with additional telematics sensor data in the automotive cloud.

Representative methods for collecting and processing telematics sensor data in accordance with the present teachings will now be described.

Representative sensors that may be used in accordance with the present teachings include but are not limited to D-GPS, windshield wiping sensors, laser sensors, camera sensors, microphone sensors, shift sensors, pedal sensors (e.g., acceleration, brake, and/or clutch), lever sensors, speed sensors, headlamp sensors, steering wheel sensors, temperature sensors, heating and/or air conditioning level sensors, and/or the like, and combinations thereof. The frequency at which the sensors are polled for data readings may vary based on power consumption reasons, processing demands, and/or bandwidth limitations.

In some embodiments, telematics sensor data readings may be sent from the vehicle to the automotive cloud while the target driver drives. In some embodiments, preprocessing of the telematics sensor data is performed onboard the vehicle, such that only high quality information is transmitted to the automotive cloud. Duplicate or long-latency telematics sensor data may also be identified and filtered onboard the vehicle itself. In some embodiments, to conserve bandwidth, the telematics sensor data may be zipped, archived, and/or batched prior to transmission of the data to the automotive cloud.

Patterns used in the construction of a driving profile may be extracted from the driver-identified telematics sensor data collected in the automotive cloud. Two such types of patterns are (1) driver movements and (2) vehicle status.

For driver movement capture, the physical behavior of a driver may be observed using the telematics sensors on the vehicle as triggers. In some embodiments, driver movement capture may be captured using one or a plurality of internal sensors provided inside the vehicle cabin. The driver's physical behavior may be modeled at varying granularity (e.g., "limb" granularity and/or "sense" granularity) at time t. With regard to limb granularity, measurements may be made regarding (1) operation by foot (e.g., the sensed position and frequency functions of the right foot on the brake and/or gas pedal, which may be measured precisely using telematics sensors on the brake and/or gas pedal, and (2) operation by hand (e.g., steering wheel angle, wiper settings, blinker settings, gear shift sensor operations, and/or the like). With regard to sense granularity, driver behavior such as (1) speech and (2) eye movements may be captured. By way of example, speech may be captured with a microphone that is provided as part of a telematics sensor suite and is used to capture voice instructions given to the car by the target driver. Eye movements of the driver during driving profile construction may be captured by camera.

Figure 6:
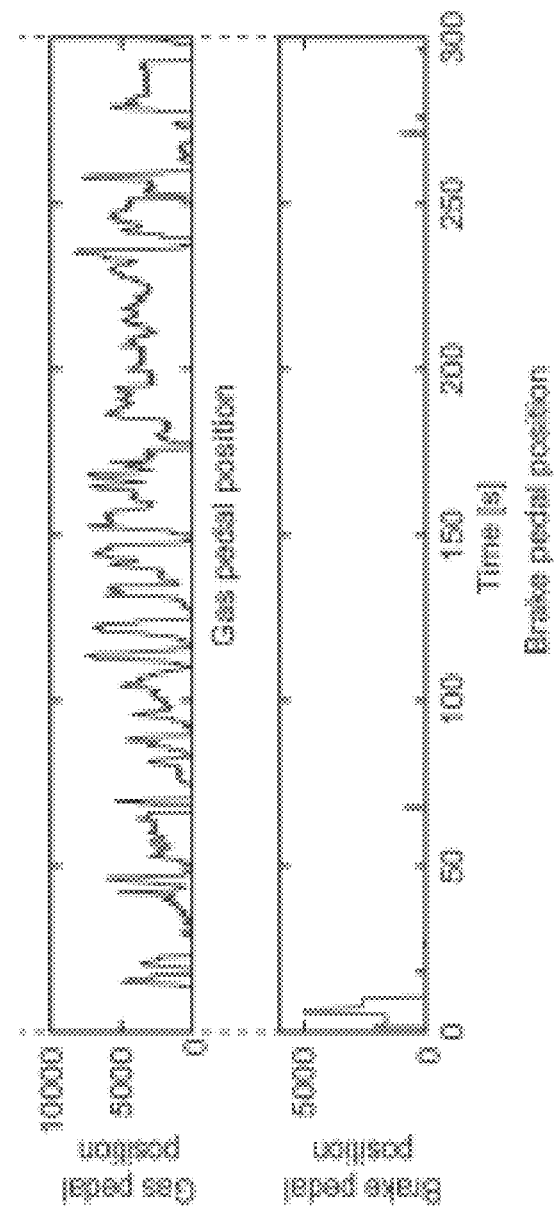
FIG. 6 shows an example of constructing a driving profile at the driver movement level via graphs of pedal position vs. time.
Figure 7:
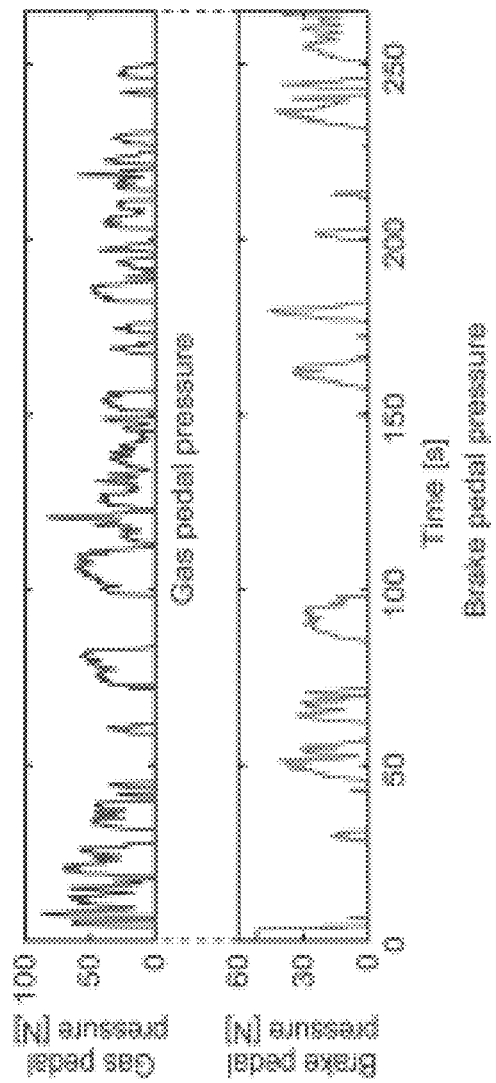
FIG. 7 shows an example of constructing a driving profile at the driver movement level via graphs of pedal pressure vs. time.
Figure 8:
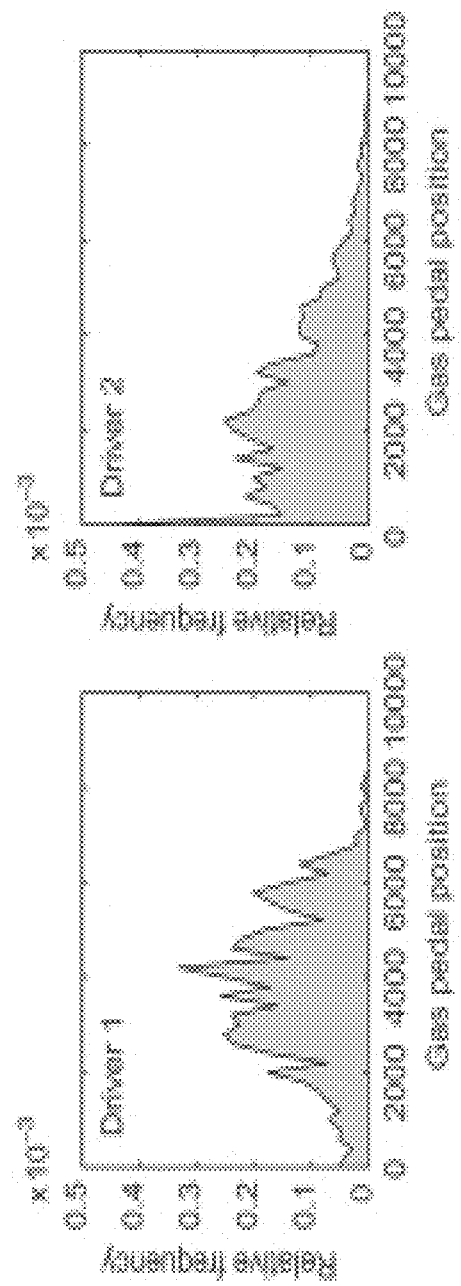
FIG. 8 shows an example of constructing a driving profile at the driver movement level via graphs of frequency vs. gas pedal position.

For each driver, information from the telematics sensors may be extracted at time t and used to construct limb or sense granulized driver movement distribution models similar to those shown in FIGS. 6, 7, and 8. Each of FIGS. 6, 7, and 8 shows an example of driving profile construction at the driver movement level. FIG. 6 shows plots of brake and gas pedal position vs. time. FIG. 7 shows plots of brake and gas pedal pressure vs. time. FIG. 8 shows plots of frequency vs. gas pedal position.

Using the above-described approach for driver movement capture, the exact driving behavior and sensor readings may be modeled for different vehicle activities. By way of example, the activities involved in stopping a vehicle on the right-hand side of a road, and corresponding representative sensor readings, may include the following: (1) release gas pedal, thereby causing a change in gas pedal pressure and gas pedal position (e.g., FIGS. 6 and 7); (2) press brake pedal, thereby causing a change in brake pedal pressure and brake pedal position (e.g., FIGS. 6 and 7); (3) activate right turn indicator, thereby triggering an indicator sensor; (4) pull to right, thereby triggering a right turn indication in a steering wheel sensor; (5) reach minimum acceleration, thereby resulting in low readings in the speed and acceleration sensors; and (6) stop.

For vehicle status capture, one or more external telematics sensors may be provided on a vehicle (e.g., in addition to or alternatively to one or more internal sensors that may likewise be provided for capturing driving behavior). In some embodiments, the vehicle status of interest to be captured may include: (1) relative position of a vehicle within a lane, which may be measured, for example, using D-GPS and/or one or a plurality of cameras; (2) distance of leading and trailing vehicle relative to the target vehicle, which may be measured, for example, using laser sensors, as shown in FIG. 9; and (3) speed and/or acceleration, which may be measured, for example, using onboard speed sensors, acceleration sensors, and/or the like.

Figure 9:
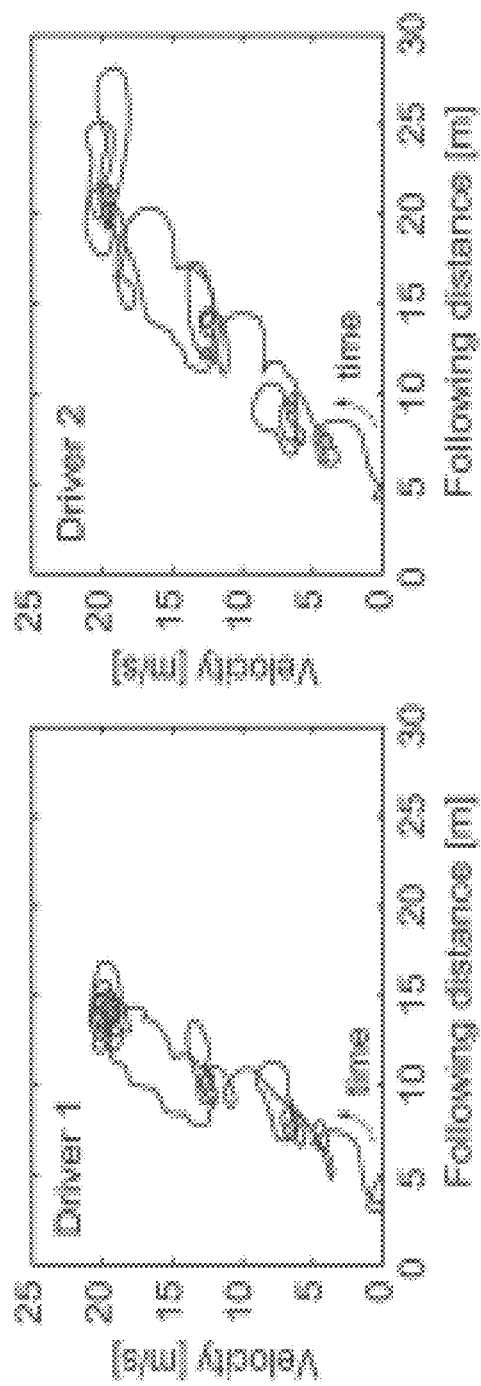
FIG. 9 shows an example of constructing a driving profile at the vehicle status level via plots of velocity vs. following distance.

FIG. 9 shows an example of constructing a driving profile at the vehicle status level via plots of velocity vs. following distance. For each driver, information from the telematics sensors may be extracted at time t and used to construct vehicle status distribution similar to the plots shown in FIG. 9.

Figure 10:
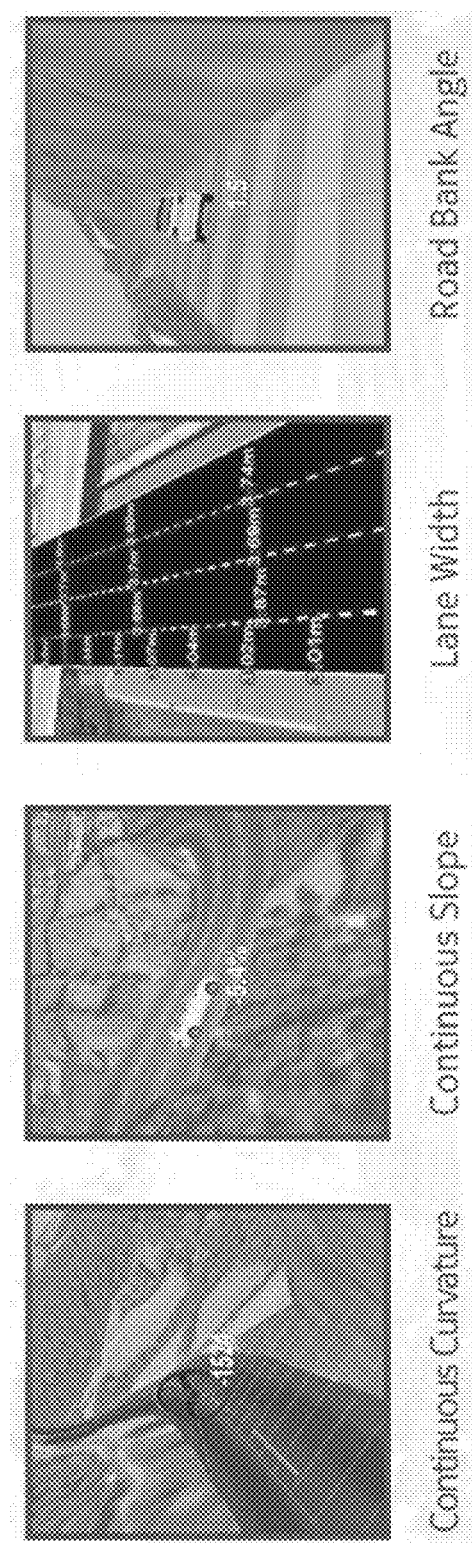
FIG. 10 shows a schematic illustration of types of real world reference data obtained from map features at the road level.

In addition to telematics sensor data, real world reference data may be used as an input for personalized driving in accordance with the present teachings. In some embodiments, the real world reference data is obtained from a 3D map. In some embodiments, as shown in FIG. 10, the real world reference data includes map features at the road level. Representative map-derived real world reference data include but are not limited to information regarding curvature, slope, lane width, road bank angle, and/or the like, and combinations thereof.

Real world reference data categorization may be used to configure a driverless system to automatically drive a vehicle like a driver on a road even when the driver has not previously driven on the road in question. By way of example, if an observation is made during construction of a driver's driving profile that the driver drives at 5 kph on a random hill called hill_1, the features of hill_1 may be extracted and categorized. Subsequently, for other hills that fall into the same category as hill_1, an autonomous vehicle may be autonomously driven in the same manner that the driver drove when ascending hill_1 (e.g., at 5 kph).

To use real world reference data as an input for personalized driving in accordance with the present teachings, map features from a real world map may be categorized and labeled. For example, a hill identified in the map may be categorized as an element of the set {very steep, steep, and slightly steep}. This categorization may be performed by fitting the slope of the target hill into a predefined interval (e.g., a slope between 10 and 30 degrees is "slightly steep"; a slope between 31 and 50 degrees is "steep"; and a slope above 50 degrees is "very steep"). In a similar manner, turns may be categorized as sharp turns, slight right turns, sharp right turns, and/or the like. Roads are already categorized as functional classes (e.g., F4, F5, etc.). Lanes may also be further categorized.

Figure 11:
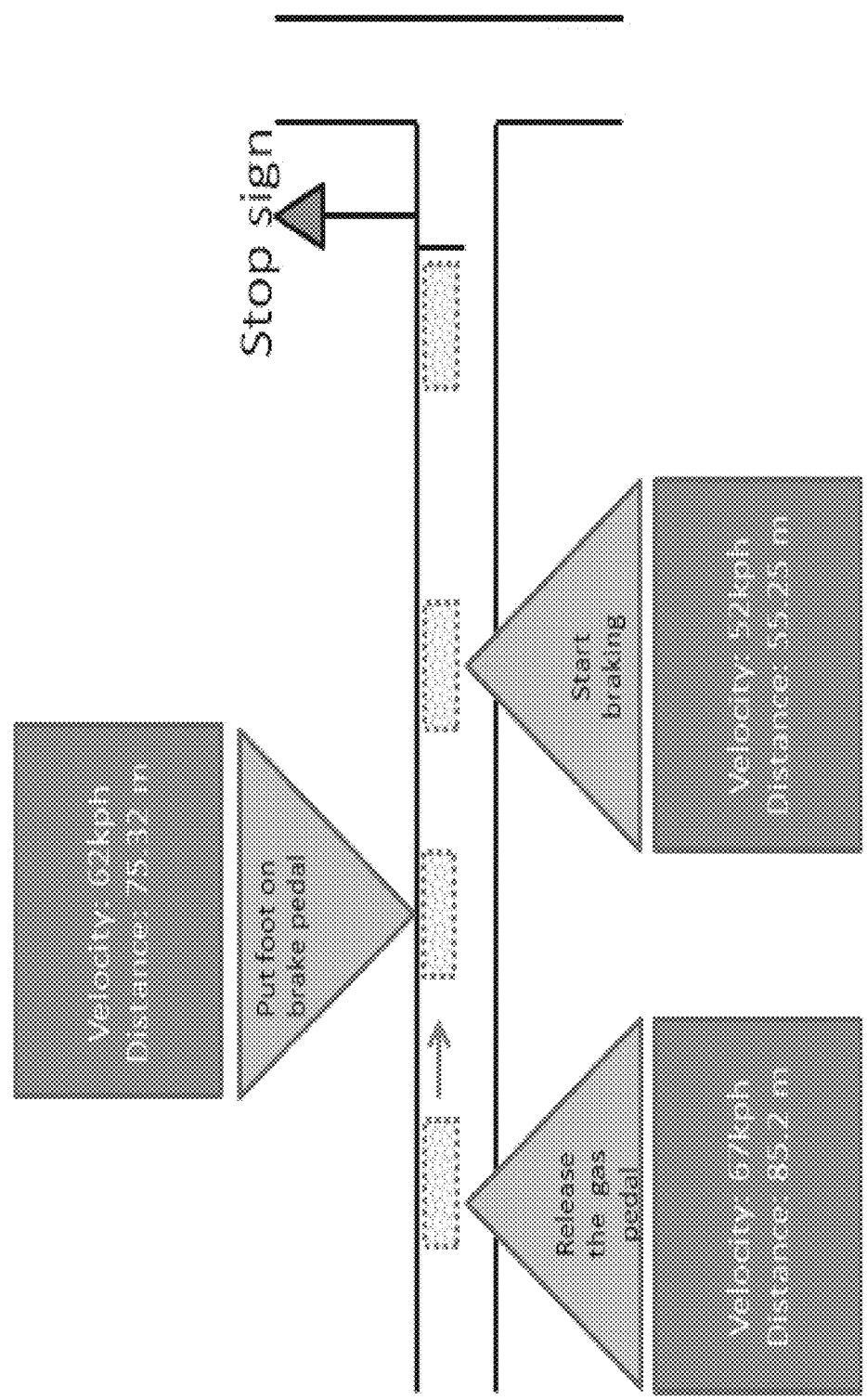
FIG. 11 shows a schematic illustration of an example of fusing telematics sensor data (e.g. driver behavior and vehicle status) with real world reference map data.

After the map-derived real world reference data have been categorized, the telematics sensor data (e.g. driver behavior and vehicle status) may be fused with real world reference map data (e.g. location of a stop sign, location of a stop light, a sharp turn, a hill, and/or the like) as shown, for example, in FIG. 11. In FIG. 11, the driver behavior is shown in the triangles, and the vehicle status information is shown in the rectangles.

Given the telematics sensor data and the real world reference map data, driving behavior may now be captured with regards to the underlying map. The driving behavior and vehicle statuses at a per-driver level may be captured as the map changes based on vehicle position.

In addition to telematics sensor data and real world reference map data, real time environmental data (e.g., weather, incidents, traffic, and/or the like, and combinations thereof) may be used as an input for personalized driving in accordance with the present teachings. By way of example, driving behavior may be modeled under different weather conditions, traffic conditions, and/or other events.

With regard to weather, real time weather sources (e.g., sensor networks) may be used to provide information on current external weather conditions of a vehicle. Sensors onboard a vehicle may also provide information regarding a current weather condition. With regard to incidents and traffic, information may be obtained from a variety of sources (e.g., Nokia/HERE maps, police scanners, news reports, aerial traffic surveillance, and/or the like) and used to provide real time traffic and incident information relative to a driver's location.

Figure 12:
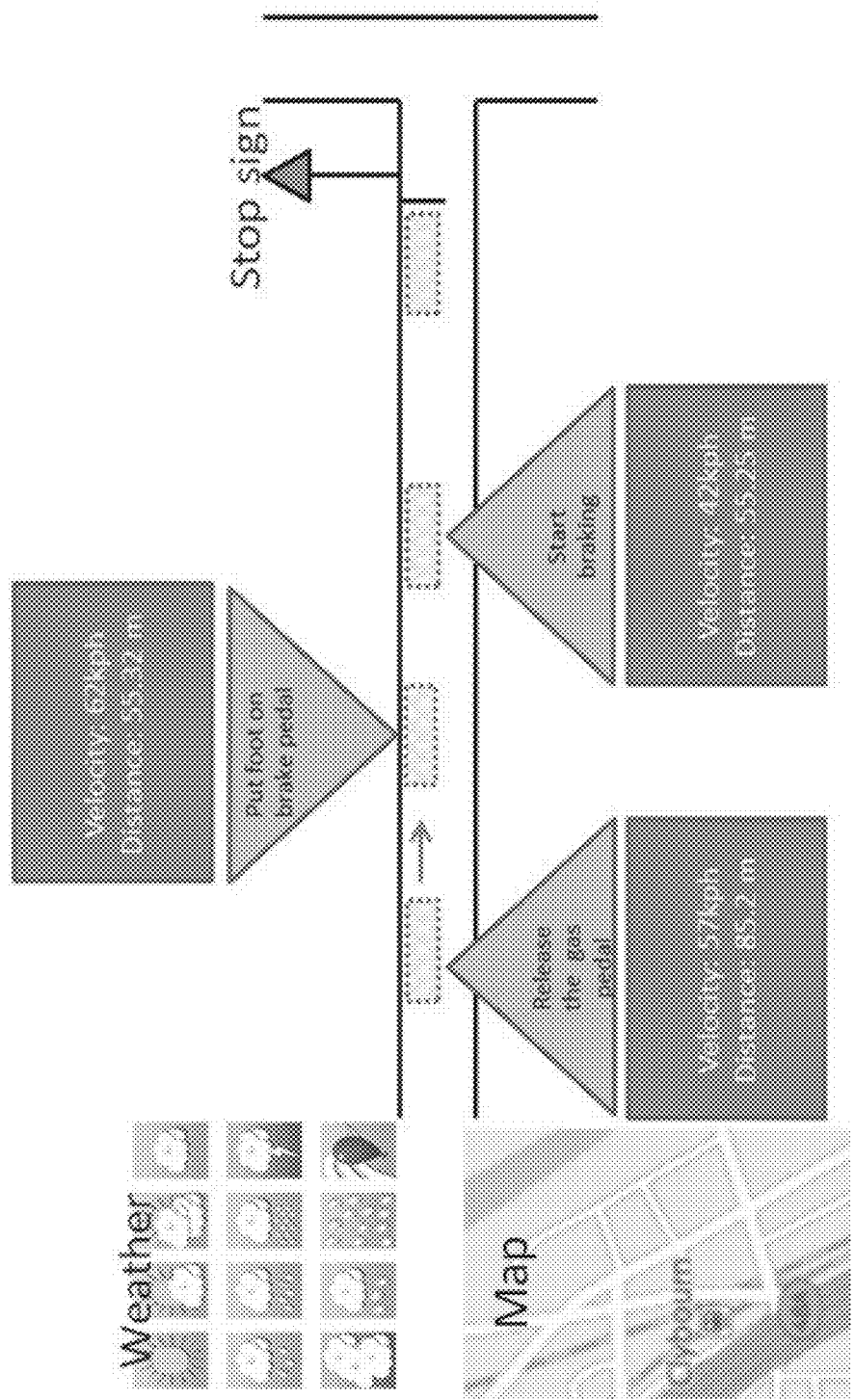
FIG. 12 shows a schematic illustration of an example of fusing telematics sensor data and real world reference map data (e.g., FIG. 11) with real time environmental data.

FIG. 12 shows an example of fusing telematics sensor data (e.g. driver behavior and vehicle status) with real world reference map data (e.g. location of a stop sign, location of a stop light, a sharp turn, a hill, and/or the like) and real time environmental data (e.g., weather, incidents, traffic, and/or the like).

In some embodiments, a driving profile may be modeled and captured using machine learning or a simple n-dimensional table scheme. This driving profile may then be archived in an automotive cloud and fed to an autonomous vehicle. Based on telematics sensor data that capture personalized driving activity and vehicle status, categorized real world reference data, and environmental data, the activity of a driver may be recorded as an n-dimensional table as shown, for example, in Table 1. For the sake of simplicity, only the dimensions of a general weather and map feature are shown. It is to be understood that other dimensions (e.g., related to incidents, traffic, specific weather, and/or the like) may also exist.

TABLE 1

Partial Driving Profile of Driver A

| | Weather [rainy] | Weather [sunny] |
|---|---|---|
| Sharp right turn | Brake 60 m from turn to about 20 kph, switch right indicator on 50 m from turn, at the turn keep steering wheel at 60 degrees | Brake 50 m from turn to about 25 kph, switch right indicator on 40 m from turn, at the turn keep steering wheel at 70 degrees |
| Steep straight hill | Hit gas with pressure 20 units 30 m to from hill, keep steering wheel at 180 degrees while driving a 10 kph | Hit gas with pressure 30 units 32 m to from hill, keep steering wheel at 180 degrees while driving a 24 kph |

An n-dimensional table analogous to the representative one for Driver A shown in Table 1 may be created for every driver in the system. When personalized driving is desired, the table may be referenced for the target driver and downloaded to the vehicle in its entirety, as shown in FIG. 3A, or piecewise, as shown in FIG. 3B.

Alternatively to or in addition to using an n-dimensional table approach, machine-learning schemes—including but not limited to Decision Trees, Hidden Markov Model, Conditional Random Field, Reinforcement Learning, Random Forest, Bayes, and/or the like—may be used to model and construct a driving profile using the same data that were used to construct the n-dimensional table.

In some embodiments, driver categorization may be performed to produce a generic driving profile from a cluster of actual driving profiles stored in an archive (e.g., an automotive cloud). By way of example, a generic driving profile for a "male teen" may be obtained by clustering all, or at least a portion, of the actual driving profiles in the archive that were previously constructed for male teens. A generic driving profile for a "driver over 70" may be obtained in similar fashion.

In some embodiments, using generic driving categories formed by the clustering of actual personalized driving profiles, new drivers may be processed in the following way. First, a new driver may drive for a period of time during which telematics sensor data are collected. The sensor data collected in this interval may be used to identify a driving category to which the new driver belongs. Once this category is identified, a generic driving profile corresponding to the category may be downloaded to the vehicle (e.g., in its entirety or in part) and the vehicle may be configured for autonomous driving. In some embodiments, a new driver may be prompted to select a candidate driving profile from a set of available categorized driving profiles.

In some embodiments, a user may download a driving profile to an autonomous vehicle. For each segment of a roadway on which the autonomous vehicle is currently traveling, approaching, and/or may potentially travel upon (e.g., pending a routing decision by the user), a deviation from the observed TDB (e.g., as extracted from the driving profile) and the predefined EDB may be checked and accumulated. The data thus collected may be used to (a) provide a heat map indicative of segments in which vehicles tend to deviate from EDB and/or (b) provide warning to other road users when TDB deviates from EDB (e.g., by a predefined amount). In addition, other road users may configure a personal threshold for the amount of deviation that is observed to trigger a warning.

In a personalized driving environment, a user may download—either deliberately or erroneously—a driving profile that may be unsuitable for a given set of roadway and/or environmental conditions and/or the like. By way of example, an autonomous vehicle executing operating instructions prescribed by the driving profile of an inexperienced teenage driver or an overly aggressive taxi cab driver may drive in an unsafe manner relative to a specific roadway and/or set of conditions, thereby potentially placing other drivers on the road network and/or any occupants of the autonomous vehicle at risk.

To at least partially mitigate the above-describe risk, a ranking of the current driving style of a roadway user (e.g., an autonomous vehicle, a vehicle equipped with one or more telematics sensors configured to transmit data about the driving style of the operator, and/or the like) may be communicated to other vehicles and/or travelers sharing the roadway. For example, if a vehicle exhibiting a chaotic driving style indicative of an emergency (e.g., an emergency vehicle, such as an ambulance, police car, fire truck, etc.), impaired driving (e.g., driving while intoxicated, driving under the influence, sleep-deprived driving, etc.), reckless driving (e.g., unsafe speeds, unsafe passing, unsafe lane changing, road rage, etc.), and/or the like—in other words, a vehicle exhibiting a TDB that deviates from EDB by an amount that exceeds a predefined threshold—a user in front of the vehicle exhibiting such behavior may be alerted that a potential risk is approaching and, in turn, may choose to pull to the side and/or take other precautions.

Figures 16, 17:
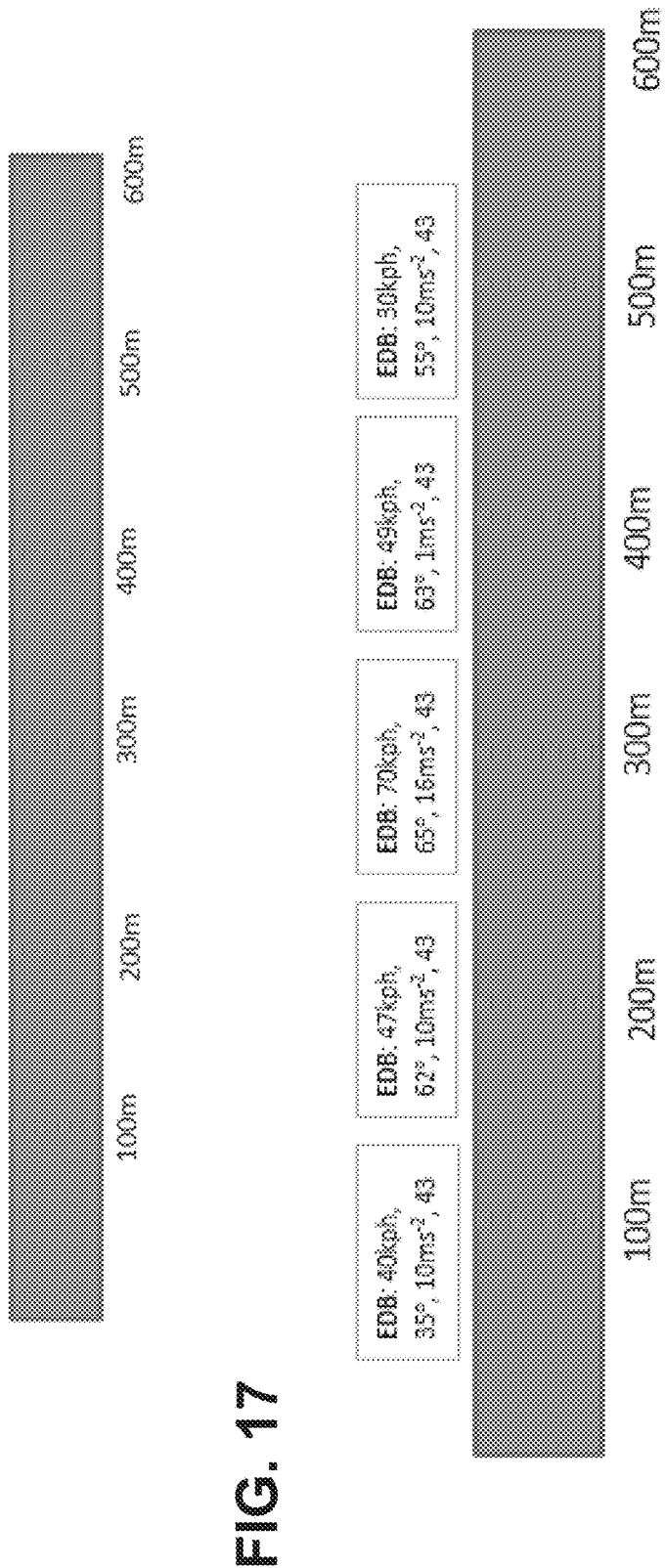
FIG. 16 shows an exemplary partitioning of a roadway into a plurality of equal-length road links.
FIG. 17 shows exemplary expected driving behaviors (EDBs) predefined for each of the links of the roadway shown in FIG. 16.

In some embodiments, methods for communicating a ranking of at least one segment of a roadway (which, in some embodiments, includes a real time assessment of a driving style exhibited by one or more other roadway users traveling on the roadway) include computing expected driving behaviors (e.g. speed, acceleration, heading, degree of weaving or sinuosity, etc.) on one or more segments of a road for an autonomous vehicle configured for personalized driving. In some embodiments, the methods include performing a partitioning of a road into links. In some embodiments, as shown in FIG. 16, the road may be partitioned into a plurality of links that are substantially equal in length. In the example shown in FIG. 16, a road has been partitioned into six substantially equal 100-meter links. In other embodiments, the road may be partitioned into a plurality of links any two or more of which may have different lengths. Once the road has been partitioned into a plurality of links, the EDB may be defined for each of the links. For example, the EDB may be computed for each perpendicular bisector of the road geometry (shown as dashed lines in the example of FIG. 16) that was added in the partitioning phase. In some embodiments, the EDB is different than posted speed limit and may define driving attributes such as expected speed, acceleration, direction, degree of weaving, and/or the like.

FIG. 17 shows an example of the EDB defined at each perpendicular bisector of the partitioned road of FIG. 16. The EDB defined for each of the links is summarized in the rectangular boxes and includes values for speed, direction, acceleration, and sinuosity). In some embodiments, other driving attributes may also be included or included as alternatives to one or more of the exemplary attributes shown in FIG. 17.

As an autonomous vehicles configured for personalized driving travels on a given road segment, the TDB exhibited by the autonomous vehicles is observed and recorded. In some embodiments, the TDB that is observed and recorded includes the same driving attributes that are defined for the EDB. In some embodiments, the TDB is computed at each bisector.

At the end of a road segment, data for the TDB of an autonomous vehicle at the bisector and corresponding predefined driving attributes for the EDB at the same bisector may be correlated as shown, for example, in FIG. 18. In FIG. 18, the EDB defined for a particular segment of a roadway is shown in the column on the left. The TDB exhibited on this same segment of the roadway (e.g., data from a specific vehicle or composite data reflecting average data from a plurality of vehicles) is shown in the column on the right. The TDB may be compared against the EDB at each bisector, and a different and independent TDB list may be computed for each vehicle.

Speed components, direction, acceleration, and sinuosity may be extracted from the two lists of data shown in FIG. 18 and compared. All manner of similarity functions are contemplated for use in accordance with the present teachings for comparing driving attributes of EDB and TDB. Representative similarity functions include but are not limited to edit distance, Levenshtein distance, Damerau-Levenshtein distance, root mean square error, and/or the like, and combinations thereof.

In some embodiments, methods in accordance with the present teachings may be used to provide a personalized driving chaos ranking of a road segment. Personalized driving chaos is directly proportional to the difference between EDB and TDB. The difference between EDB and TDB at time t by the $i^{th}$ vehicle may be represented by $diff(t)^i$. The ranking for all of the n vehicles that traverse the road segment at time t may be computed as shown in the following formula:

$$\text{ranking} = \sum_{i=1}^{n} \text{diff}(t)^i / n$$

Figure 19:
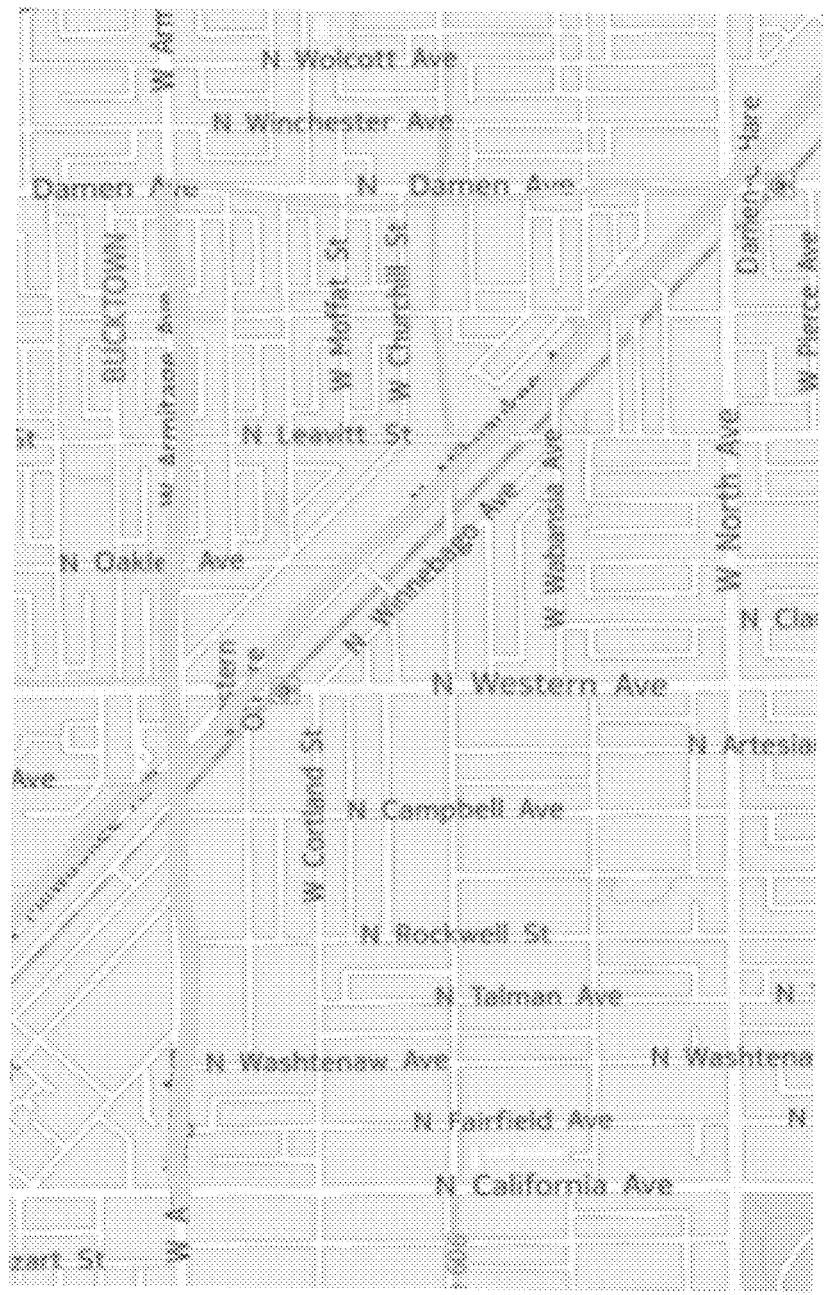
FIG. 19 shows an example of a representative display format for reporting color-coded ranking of segments of a roadway to a user on a vehicular navigation system.

Personalized driving chaos is directly proportional to the ranking for a given road segment. Thus, for each city, a heat map showing the likelihood for personalized driving chaos on different road segments may be prepared. In some embodiments, determinations of the likelihood of personalized driving chaos may be based on historical analysis. In some embodiments, road segments on a map with the highest personalized driving chaos rankings may be colored red, road segments with moderate personalized driving chaos may be colored yellow, and road segments with low personalized driving chaos may be colored green. By using a map that differentiates different levels of personalized driving chaos (e.g., via color-coding and/or the like), roads with a high likelihood of personalized driving chaos may be deliberately avoided by cautious drivers. FIG. 19 shows an example of a map in which road segments with a low likelihood of personalized driving chaos are shown in green and road segments with a moderate likelihood of personalized driving chaos are shown in yellow. The terms "high," "low," and "moderate" as used in reference to personalized driving chaos refer to thresholds and/or ranges that, in some embodiments, are individually predefined and personalized (e.g., by an individual user). In other embodiments, these terms refer to predefined thresholds and/or ranges that are standardized for all users across a network.

In the example shown in FIG. 18, warnings/alerts may be issued based on the similarities between the two lists at the residual level or at the sublist level. By way of example, for a sublist on acceleration, the two lists from FIG. 18 would be TDB={12, 20, 16, 1, 10} and EDB={10, 10, 16, 1, 10}. The computed root mean square error (RMSE) is 4.5607. Based on this comparison, vehicles on adjoining road segments ahead of a candidate vehicle may be alerted that a fast-accelerating vehicle is approaching. In a further residual-based example, the EDB for speed is 40 kph at 100 m on the road segment, whereas the TDB for the vehicle is 140 kph. As a result of this comparison, upstream vehicles may be warned that a very fast vehicle is approaching from the rear. The upstream vehicles may pull to the side to provide passage for the very fast vehicle in a manner analogous to a driver's reaction to an emergency vehicle.

Warnings may also be computed at the sublist level. For example, observation of the entire lists shown in FIG. 18 reveals that at the end of the road segment, the TDB was close to the EDB and, therefore no warnings may be sent.

The computed similarity/difference between the EDB and TDB may be communicated to other users in range (e.g., drivers, travelers, and/or pedestrians) so that those users may optionally adjust their traveling styles based on the information received.

On the receiving end, a user (e.g., vehicles, drivers, travelers, and/or pedestrians) may configure and define the type of warnings that the user wants to receive. By way of example, a client receiving device may be configured to receive alerts only if the difference between the EDB and the TDB is greater than 20 units (where the generic term "units" represents a personalized configurable parameter). In some embodiments, a receiving device may be configured to receive warnings only if the user is traveling in the same direction of travel as an approaching warning-triggering vehicle. In some embodiments, a receiving device may be configured to receive warnings only if the warning-triggering vehicle is within a predefined distance range from the user. In some embodiments, the receiving device may be configured to receive warnings only if an external computing device computes that there is high likelihood that the warning-triggering vehicle will affect the user (e.g., where the term "high" refers to a pre-definable threshold and/or range).

Thus, in some embodiments, methods in accordance with the present teachings for communicating a ranking characterizing a portion of a roadway provide a strategy for mitigating the chaos that may ensue in connection with personalized driving of autonomous vehicles. However, it should be noted that these methods are not restricted to the context of personalized driving of autonomous vehicles and may likewise be applicable in other contexts (e.g., issuing alerts to drivers of manually operated vehicles that another manually-operated vehicle approaching from the rear is driving in a chaotic manner, etc.).

Methods for communicating a ranking characterizing a portion of a roadway in accordance with the present teachings may be used to predict congestion, to determine the start/end of construction zones, to validate reported incidents, and/or to facilitate safe routing (e.g., avoiding driving on the shoulders of roads with narrow lanes, etc.).

One skilled in the art will appreciate that one or more modules or logic described herein may be implemented using, among other things, a tangible computer-readable medium comprising computer-executable instructions (e.g., executable software code). Alternatively, modules may be implemented as software code, firmware code, hardware, and/or a combination of the aforementioned.

Figure 14:
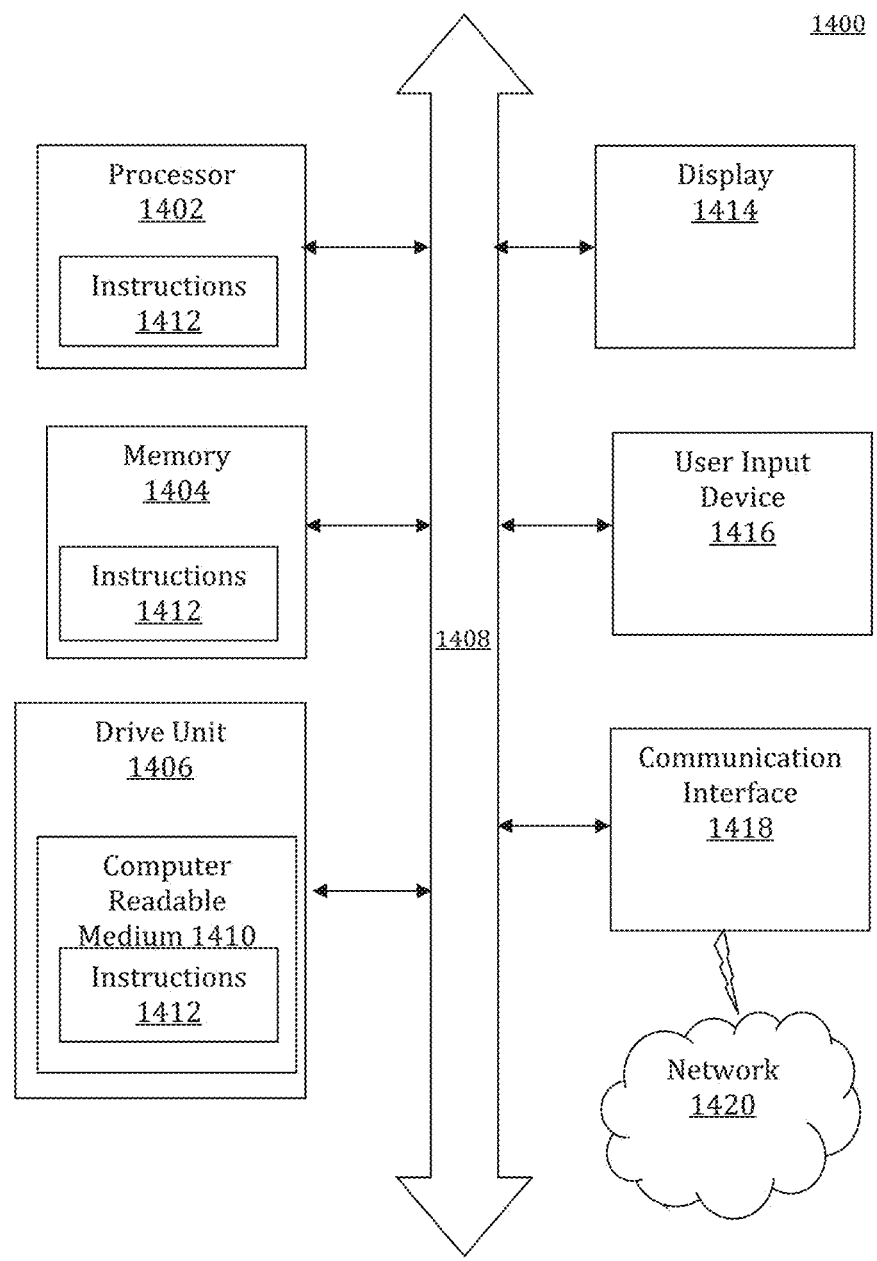
FIG. 14 shows a representative general computer system 1400 for use with an apparatus in accordance with the present teachings.

FIG. 14 depicts an illustrative embodiment of a general computer system 1400. The computer system 1400 can include a set of instructions that can be executed to cause the computer system 1400 to perform any one or more of the methods or computer based functions disclosed herein. The computer system 1400 may operate as a standalone device or may be connected (e.g., using a network) to other computer systems or peripheral devices. Any of the components discussed above, such as the processor, may be a computer system 1400 or a component in the computer system 1400. The computer system 1400 may implement a personalized driving module for personalized driving of autonomously driven vehicles, of which the disclosed embodiments are a component thereof.

In a networked deployment, the computer system 1400 may operate in the capacity of a server or as a client user computer in a client-server user network environment, or as a peer computer system in a peer-to-peer (or distributed) network environment. The computer system 1400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a landline telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In some embodiments, the computer system 1400 can be implemented using electronic devices that provide voice, video or data communication. Further, while a single computer system 1400 is illustrated, the term "system" shall also be taken to include any collection of systems or sub-systems that individually or jointly execute a set, or multiple sets, of instructions to perform one or more computer functions.

As shown in FIG. 14, the computer system 1400 may include a processor 1402, for example a central processing unit (CPU), a graphics-processing unit (GPU), or both. The processor 1402 may be a component in a variety of systems. For example, the processor 1402 may be part of a standard personal computer or a workstation. The processor 1402 may be one or more general processors, digital signal processors, application specific integrated circuits, field programmable gate arrays, servers, networks, digital circuits, analog circuits, combinations thereof, or other now known or later developed devices for analyzing and processing data. The processor 1402 may implement a software program, such as code generated manually (i.e., programmed).

The computer system 1400 may include a memory 1404 that can communicate via a bus 1408. The memory 1404 may be a main memory, a static memory, or a dynamic memory. The memory 1404 may include, but is not limited to, computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In some embodiments, the memory 1404 includes a cache or random access memory for the processor 1402. In alternative embodiments, the memory 1404 is separate from the processor 1402, such as a cache memory of a processor, the system memory, or other memory. The memory 1404 may be an external storage device or database for storing data. Examples include a hard drive, compact disc (CD), digital video disc (DVD), memory card, memory stick, floppy disc, universal serial bus (USB) memory device, or any other device operative to store data. The memory 1404 is operable to store instructions executable by the processor 1402. The functions, acts or tasks illustrated in the figures or described herein may be performed by the programmed processor 1402 executing the instructions 1412 stored in the memory 1404. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown in FIG. 14, the computer system 1400 may further include a display unit 1414, such as a liquid crystal display (LCD), an organic light emitting diode (OLED), a flat panel display, a solid state display, a cathode ray tube (CRT), a projector, a printer or other now known or later developed display device for outputting determined information. The display 1414 may act as an interface for the user to see the functioning of the processor 1402, or specifically as an interface with the software stored in the memory 1404 or in the drive unit 1406.

Additionally, as shown in FIG. 14, the computer system 1400 may include an input device 1416 configured to allow a user to interact with any of the components of system 1400. The input device 1416 may be a number pad, a keyboard, or a cursor control device, such as a mouse, or a joystick, touch screen display, remote control or any other device operative to interact with the system 1400.

In some embodiments, as shown in FIG. 14, the computer system 1400 may also include a disk or optical drive unit 1406. The disk drive unit 1406 may include a computer-readable medium 1410 in which one or more sets of instructions 1412 (e.g., software) can be embedded. Further, the instructions 1412 may embody one or more of the methods or logic as described herein. In some embodiments, the instructions 1412 may reside completely, or at least partially, within the memory 1404 and/or within the processor 1402 during execution by the computer system 1400. The memory 1404 and the processor 1402 also may include computer-readable media as described above.

The present teachings contemplate a computer-readable medium that includes instructions 1412 or receives and executes instructions 1412 responsive to a propagated signal, so that a device connected to a network 1420 can communicate voice, video, audio, images or any other data over the network 1420. Further, the instructions 1412 may be transmitted or received over the network 1420 via a communication interface 1418. The communication interface 1418 may be a part of the processor 1402 or may be a separate component. The communication interface 1418 may be created in software or may be a physical connection in hardware. The communication interface 1418 is configured to connect with a network 1420, external media, the display 1414, or any other components in system 1400, or combinations thereof. The connection with the network 1420 may be a physical connection, such as a wired Ethernet connection or may be established wirelessly as discussed below. Likewise, the additional connections with other components of the system 1400 may be physical connections or may be established wirelessly.

The network 1420 may include wired networks, wireless networks, or combinations thereof. The wireless network may be a cellular telephone network, an 802.11, 802.16, 802.20, or WiMax network. Further, the network 1420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of subject matter described in this specification can be implemented as one or more computer program products, for example, one or more modules of computer program instructions encoded on a computer-readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer-readable medium can be a machine-readable storage device, a machine-readable storage substrate, a memory device, or a combination of one or more of them. The term "data processing apparatus" encompasses all apparatuses, devices, and machines for processing data, including but not limited to, by way of example, a programmable processor, a computer, or multiple processors or computers. The apparatus can include, in addition to hardware, code that creates an execution environment for the computer program in question (e.g., code that constitutes processor firmware, a protocol stack, a database management system, an operating system, or a combination thereof).

In some embodiments, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the present teachings are considered to include any one or more of a computer-readable medium or a distribution medium and other equivalents and successor media, in which data or instructions may be stored.

In some embodiments, dedicated hardware implementations, such as application specific integrated circuits, programmable logic arrays, and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In some embodiments, the methods described herein may be implemented by software programs executable by a computer system. Further, in some embodiments, implementations can include distributed processing, component/object distributed processing, and parallel processing. Alternatively, virtual computer system processing can be constructed to implement one or more of the methods or functionality as described herein.

Although the present teachings describe components and functions that may be implemented in particular embodiments with reference to particular standards and protocols, the present invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform functions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The main elements of a computer are a processor for performing instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices. Moreover, a computer can be embedded in another device, for example, a mobile telephone, a personal digital assistant (PDA), a mobile audio player, a Global Positioning System (GPS) receiver, to name just a few. Computer-readable media suitable for storing computer program instructions and data include all forms of non volatile memory, media and memory devices, including but not limited to, by way of example, semiconductor memory devices (e.g., EPROM, EEPROM, and flash memory devices); magnetic disks (e.g., internal hard disks or removable disks); magneto optical disks; and CD ROM and DVD-ROM disks. The processor and the memory can be supplemented by, or incorporated in, special purpose logic circuitry.

To provide for interaction with a user, some embodiments of subject matter described herein can be implemented on a device having a display, for example a CRT (cathode ray tube) or LCD (liquid crystal display) monitor, for displaying information to the user and a keyboard and a pointing device, for example a mouse or a trackball, by which the user can provide input to the computer. Other kinds of devices can be used to provide for interaction with a user as well. By way of example, feedback provided to the user can be any form of sensory feedback (e.g., visual feedback, auditory feedback, or tactile feedback); and input from the user can be received in any form, including but not limited to acoustic, speech, or tactile input.

Embodiments of subject matter described herein can be implemented in a computing system that includes a back-end component, for example, as a data server, or that includes a middleware component, for example, an application server, or that includes a front end component, for example, a client computer having a graphical user interface or a Web browser through which a user can interact with an implementation of the subject matter described in this specification, or any combination of one or more such back end, middleware, or front end components. The components of the system can be interconnected by any form or medium of digital data communication, for example, a communication network. Examples of communication networks include but are not limited to a local area network (LAN) and a wide area network (WAN), for example, the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 CFR §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding claim—whether independent or dependent—and that such new combinations are to be understood as forming a part of the present specification.

The foregoing detailed description and the accompanying drawings have been provided by way of explanation and illustration, and are not intended to limit the scope of the appended claims. Many variations in the presently preferred embodiments illustrated herein will be apparent to one of ordinary skill in the art, and remain within the scope of the appended claims and their equivalents.

The invention claimed is:

1. A method comprising:
   determining a portion of a driving profile associated with one variation of driving manner of a specific driver based on a spatial or temporal environmental property around a vehicle, wherein the driving profile contains a plurality of variations of driving manners of the specific driver;
   downloading, by a processor, the portion of the driving profile from a cloud server to the vehicle, wherein the vehicle is configured for autonomous driving, wherein downloading the portion of the driving profile downloads less than an entirety of the driving profile; and
   executing, by the processor, one or a plurality of operating instructions prescribed by the portion of the driving profile, such that the vehicle is operable in a driving style imitative of the specific driver.

2. The method of claim 1 wherein the driving profile is stored in a plurality of cloud servers.

3. The method of claim 2 wherein the downloaded portion is constrained by a variable related to the vehicle and/or an environment of the vehicle.

4. The method of claim 3 wherein the variable is selected from the group consisting of a geographical location, a type of road, a type of terrain, a type of weather, a type of season, a time of day, a degree of visibility, a volume of traffic, a priority of travel purpose, and combinations thereof.

5. The method of claim 3 further comprising:
   refreshing, by the processor, a content of the downloaded portion based on a change to the spatial or temporal environmental property around the vehicle.

6. The method of claim 1 further comprising:
   receiving, by the processor, identification information for the specific driver, whereby the driving profile associated with the specific driver is determinable.

7. The method of claim 1 wherein the driving profile represents only one of a plurality of stored driving profiles associated with the specific driver.

8. The method of claim 7 further comprising:
   selecting, by the processor, which of the plurality of stored driving profiles to access.

9. The method of claim 1 further comprising:
   determining, by the processor, whether a driving profile exists for the specific driver.

10. The method of claim 1 wherein the vehicle comprises:
    a plurality of vehicles, wherein each of the plurality of vehicles is configured for autonomous driving, wherein each of the plurality of vehicles is operable to download the portion of the driving profile for the specific driver from the cloud server, and wherein the plurality of vehicles is configured to participate in a platooning trip.

11. The method of claim 1 wherein the driving profile represents a generic profile, wherein the generic profile is associated with a specific driving category, and wherein the method further comprises matching, by the processor, the specific driver to the specific driving category.

12. The method of claim 1 further comprising:
    modifying, by the processor, the driving profile.

13. The method of claim 1 further comprising:
    deleting, by the processor, the driving profile.

14. The method of claim 1 further comprising:
    constructing, by the processor, the driving profile if a determination is made that the driving profile does not already exist.

15. The method of claim 1 further comprising:
    acquiring, by the processor, telematics sensor data from one or a plurality of telematics sensors onboard the vehicle;
    accessing, by the processor, real world reference data;
    acquiring, by the processor, real time environmental data corresponding to a status of an environment of the vehicle; and
    modeling, by the processor, the driving profile based on at least a portion of the telematics sensor data, at least a portion of the real world reference data, and at least a portion of the real time environmental data.

16. The method of claim 1, wherein the downloaded portion of the driving profile is restricted based on a driving profile of an owner of the vehicle.

17. An apparatus comprising:
    at least one processor; and
    at least one memory including computer program code for one or more programs, the at least one memory and the computer program code configured to, with the at least one processor, cause the apparatus to perform at least the following:
      determine a portion of a driving profile associated with a specific driver and a vehicle type, wherein the determined portion of the driving profile is associated with a manner of driving of the specific driver based on the type of vehicle;
      download, from a remote server, the determined portion of the driving profile to a vehicle, wherein the vehicle is configured for autonomous driving and a type of the vehicle matches the vehicle type of the determined portion of the driving profile, wherein downloading the determined portion of the driving profile downloads less than an entirety of the driving profile; and
      execute one or a plurality of operating instructions prescribed by the determined portion of the driving profile, such that the vehicle is operable in a driving style imitative of the specific driver for the vehicle type.

18. The apparatus of claim 17, wherein the at least one memory and the computer program code is configured to, with the at least one processor, cause the apparatus to perform at least the following:
    constraining, prior to executing the one or more instructions, the downloaded portion of the driving profile based on an environment of the vehicle.

19. A non-transitory computer-readable storage medium having stored therein data representing instructions executable by a programmed processor, the storage medium comprising instructions for:
- determining a portion of a driving profile associated with a specific driver, an environmental condition and a vehicle type, wherein the determined portion of the driving profile is associated with a manner of driving of the specific driver based on the type of vehicle and the environmental condition;
- downloading the portion of a driving profile to the vehicle, wherein the vehicle is configured for autonomous driving and a type of the vehicle matches the vehicle type of the portion of the driving profile; and
- executing one or a plurality of operating instructions prescribed by the driving profile, such that the vehicle is operable in a driving style imitative of the specific driver for the vehicle type and the environmental condition.

20. The non-transitory computer-readable storage medium of claim 19, wherein the environmental condition comprises a rainy condition, a snowy condition or a dry condition.

\* \* \* \* \*